United States Patent
Helline

(10) Patent No.: US 11,691,559 B2
(45) Date of Patent: *Jul. 4, 2023

(54) METHOD OF RAISING OR LOWERING A LANDING GEAR

(71) Applicant: KELLYSRT, LLC, Canal Fulton, OH (US)

(72) Inventor: Steven M. Helline, Canal Fulton, OH (US)

(73) Assignee: WALLYXCR, LLC, Canal Fulton, OH (US)

(*) Notice: Subject to any disclaimer, the term of this patent is extended or adjusted under 35 U.S.C. 154(b) by 12 days.

This patent is subject to a terminal disclaimer.

(21) Appl. No.: 17/231,641

(22) Filed: Apr. 15, 2021

(65) Prior Publication Data
US 2021/0229592 A1    Jul. 29, 2021

Related U.S. Application Data

(63) Continuation of application No. 17/126,386, filed on Dec. 18, 2020, now abandoned, which is a
(Continued)

(51) Int. Cl.
*B60P 7/08* (2006.01)
*F16G 11/12* (2006.01)
(Continued)

(52) U.S. Cl.
CPC ............. *B60P 7/0853* (2013.01); *B60S 9/08* (2013.01); *F16G 11/12* (2013.01); *F16H 3/001* (2013.01);
(Continued)

(58) Field of Classification Search
CPC ...... B60P 7/0853; B60P 7/0838; B25B 13/06; B25B 13/48; B60S 9/04; B60S 9/06
See application file for complete search history.

(56) References Cited

U.S. PATENT DOCUMENTS

| 2,446,660 A | 8/1948 | Mulkey et al. |
| 3,065,007 A | 11/1962 | Colmer, Jr. |

(Continued)

FOREIGN PATENT DOCUMENTS

| CA | 2753839 | 3/2013 | |
| WO | 2005073122 | 8/2005 | |
| WO | WO-2005073122 A1 * | 8/2005 | ............. B25B 17/02 |

OTHER PUBLICATIONS

Inside the Best Off-Road Jack! AGM Manual Jack Overview, https://www.youtube.com/watch?v=5zzgoUdQTEE, Dec. 14, 2021.
(Continued)

*Primary Examiner* — William C Doerrler
(74) *Attorney, Agent, or Firm* — Sand. Sebolt & Wernow Co., LPA

(57) ABSTRACT

A torque load binder for changing tension in a chain or strap securing a load to a vehicle or support surface. The load binder includes a housing with an internal gear mechanism and a connector mechanism operatively engaged with the gear mechanism and extending outwardly from the housing. A high speed first driveshaft and a lower speed second driveshaft on the load binder are selectively individually actuated to effect movement between first and second end linkages of the connector mechanism. The first driveshaft effects movement between the first and second end linkages at a first speed and the second driveshaft effects movement between the end linkages at a lower second speed. Rotation of either of the first or second driveshafts actuates the connector mechanism, changing the distance between the first and second end linkages, and thereby changing the tension in the tie-down.

18 Claims, 13 Drawing Sheets

Related U.S. Application Data continuation-in-part of application No. 17/093,729, filed on Dec. 1, 2020, now abandoned, which is an application for the reissue of Pat. No. 10,308,163.

(51) Int. Cl.
  *B60S 9/08* (2006.01)
  *F16H 3/06* (2006.01)
  *F16H 57/039* (2012.01)
  *F16H 57/04* (2010.01)
  *F16H 3/00* (2006.01)
  *F16H 57/02* (2012.01)

(52) U.S. Cl.
  CPC ............. *F16H 3/06* (2013.01); *F16H 57/039* (2013.01); *F16H 57/0464* (2013.01); *F16H 2057/02082* (2013.01)

(56) References Cited

U.S. PATENT DOCUMENTS

| | | | |
|---|---|---|---|
| 3,338,359 A | 8/1967 | Baillie et al. | |
| 4,223,869 A | 9/1980 | Patterson, III et al. | |
| 4,830,339 A | 5/1989 | McGee et al. | |
| 4,923,175 A * | 5/1990 | Bentrup | B60S 9/08 254/419 |
| 4,993,687 A | 2/1991 | Crook et al. | |
| 5,199,738 A * | 4/1993 | VanDenberg | B60S 9/08 74/345 |
| 5,611,521 A | 3/1997 | Grover et al. | |
| 5,911,409 A | 6/1999 | Grover | |
| 6,176,145 B1 | 1/2001 | Jackson | |
| 7,055,804 B2 | 6/2006 | Scott | |
| 7,552,913 B1 | 6/2009 | Amoss et al. | |
| 8,152,139 B2 | 4/2012 | Wang | |
| 8,166,831 B2 | 5/2012 | Ruan | |
| 10,088,016 B2 | 10/2018 | Bujold et al. | |
| 10,308,163 B2 | 6/2019 | Helline et al. | |
| 2008/0296869 A1 * | 12/2008 | Hugo Duarte Santos | B60D 1/66 280/475 |
| 2014/0109361 A1 * | 4/2014 | Helline | B60P 7/083 24/68 CD |
| 2015/0197127 A1 * | 7/2015 | Magestro | B60S 9/18 173/217 |
| 2017/0232881 A1 | 8/2017 | Thompson | |
| 2017/0355298 A1 | 12/2017 | Cahall | |
| 2019/0186595 A1 | 6/2019 | Agarwalla et al. | |

OTHER PUBLICATIONS

TrucknTow.com website—http://www.truckntow.com/images/Product/large/LBR10-H.jpg—document is undated but was printed on Feb. 15, 2013.

* cited by examiner

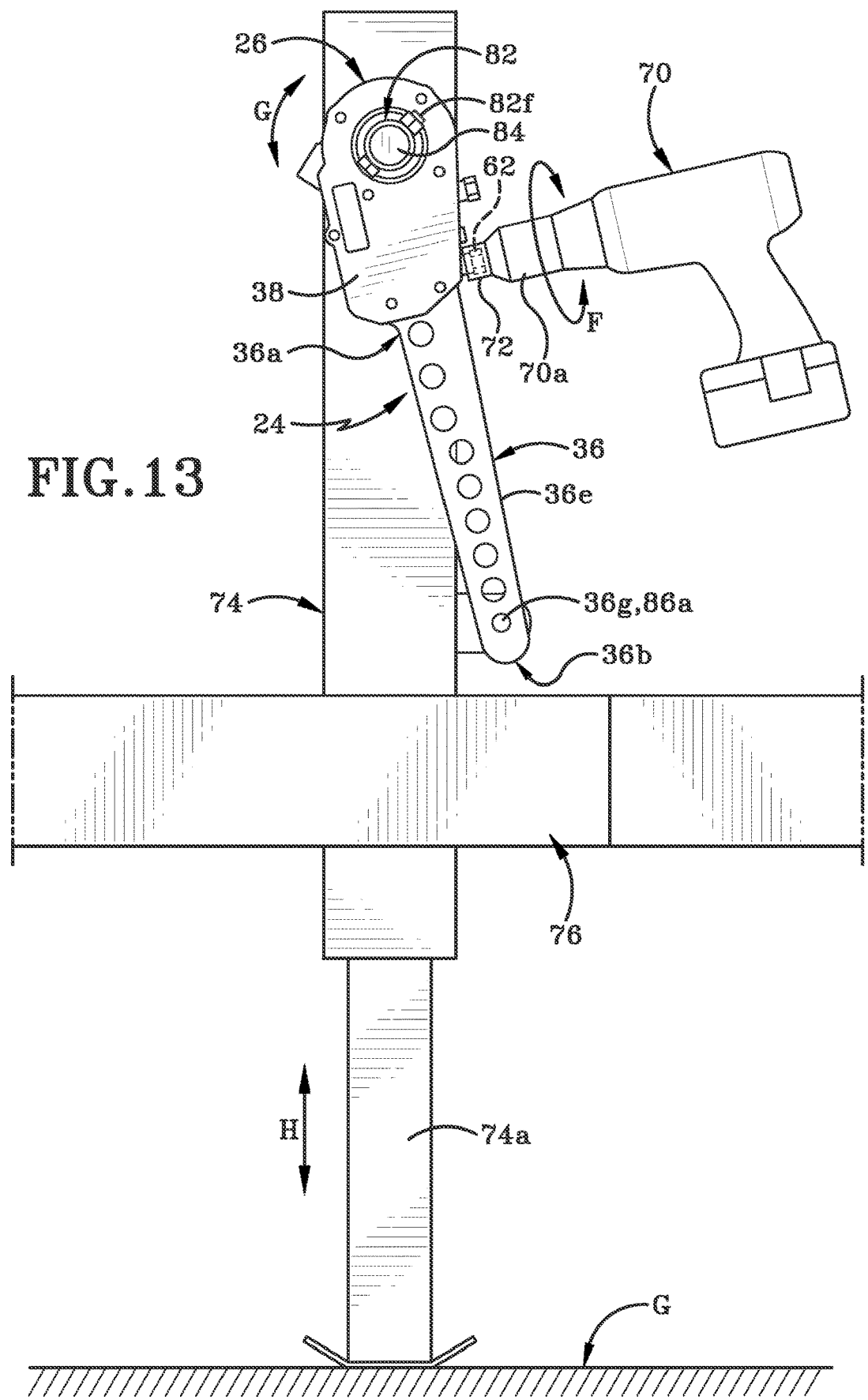

METHOD OF RAISING OR LOWERING A LANDING GEAR

CROSS REFERENCE TO RELATED APPLICATIONS

This application is a Continuation of U.S. patent application Ser. No. 17/126,386 filed Dec. 18, 2020, which is a Continuation-in-Part of U.S. patent application Ser. No. 17/093,729 filed Dec. 1, 2020, which is a reissue of U.S. patent application Ser. No. 15/448,784 filed Mar. 3, 2017, the entire disclosures of which are incorporated herein by reference.

TECHNICAL FIELD

The present disclosure is related generally to load binders and to a method of using such load binders. More particularly, the disclosure is directed to a load binder having a dual drive torque assembly that is actuated utilizing a hand-held drill for relatively rapid operation of the load binder.

BACKGROUND

Background Information

Load binders are well known for use when tightening chains, straps, or other tie-downs that are wrapped around a load carried on a trailer or on another vehicle. Typically, the load binder has end links or linkages which include hooks. The hooks may be engaged with the chain, strap, or other tie-down and the load binder is actuated to tighten the chain, strap, or other tie-down around the load.

A number of different load binders are known in the art. One type of load binder is known as a lever load binder. Lever load binders are typically attached to two spaced-apart links of a chain or strap that passes around a load. After hooking the hooks of the load binder to the links of the chain, the lever is grasped by the operator and is rotated about a pivot point along the plane in which the end links or linkages of the load binder are disposed. The rotational motion of the lever will draw the two chain links towards each other and thereby tighten the chain around the load. While lever load binders are relative fast and easy to operate, they may pose a fairly significant risk to the operator when they are released. This is because the chain and therefore the lever binder is held under tension. When the lever is released to rotate back to its original position, that rotation may occur far more rapidly and with greater force than the operator expects. The operator may not move fast enough out of the way of the rotating lever which may then strike the operator and injure him or her.

Another type of load binder is a ratchet load binder that is actuated using a ratchet system instead of a rotating lever. Ratchet load binders are safer to operate than are lever load binders and provide more of a mechanical advantage relative to lever load binders. Typically, ratchet binders include a housing having a centrally-located binder gear and binder hooks that are extendable outwardly from the housing. The operator will engage the ratchet load binder by disengaging a pawl that is operatively linked to the binder gear, fully extending the binder hooks outwardly from the housing, hooking the binder hooks to spaced-apart links of a chain (or to a link of a chain and a securement point on the vehicle), and then moving the pawl to the appropriate setting to allow the load binder to tighten the chain. Grasping a handle that extends outwardly from the housing, the operator will begin to ratchet the chain, drawing the spaced-apart chain links towards one another or drawing the chain link towards a securement point on the vehicle, thereby tightening the chain around the load. When it is desired to loosen the chain once again, the pawl is moved to an appropriate setting to allow the tension in the chain to be release and, grasping the handle once again, the operator will ratchet the load binder and releases the tension in the chain. When there is sufficient slack in the chain, the hooks of the ratchet load binder will be disengaged from the chain and securement point, and the chain will be removed from around the load.

Ratchet load binders are generally safer to use than lever load binders but they are relatively slow to operate because of the need to move the handle back and forth to actuate the ratchet mechanism. An additional issue with ratchet binders is that they tend to twist the chains they are being used to tighten. This twisting motion may interfere with the operator managing to get the chains tight enough around a load and the twisting motion potentially damages or weakens the chains. A further issue with ratchet binders is that the ratchet gear, pawl, and threads on the threaded rods engaged with the ratchet gear tend to get encrusted with dirt, salt, ice, or snow as the vehicle moves along the roads. The ratchet load binders have to be frequently cleaned and greased and without this maintenance may tend to lock up and be difficult to use. Operators also can develop repetitive type stress injuries from using these devices.

Another issue operators experience when using lever or ratchet load binders is that it is difficult to initially tighten the chains to a sufficient degree that they will not tend to loosen as the vehicle travels over bumpy roads. Operators need to periodically stop their vehicle and check the tightness of the chains to ensure that the load is still being adequately restrained. If it is found that the chains have loosened, then the operator needs to make the necessary adjustments with the lever or ratchet load binders to tighten the chains back up again. This perpetual need to stop and check the chains adds up to lost travel time and therefore increases costs of operation. Furthermore, having loose chains restraining a load may allow the load to shift during travel and this places the operator and others along the operator's route at risk of injury.

U.S. patent application Ser. No. 17/093,729 (Helline), which is incorporated herein by reference, discloses a torque load binder that is more effective at tightening chains than lever or ratchet load binders. The disclosed torque load binder includes a housing that encases a worm gear mechanism which moves the end linkages that engage the chain towards or away from each other. The worm gear mechanism is rotated by engaging a hand-held drill with an actuator provided on the housing. A grease fitting provided on the housing allows the operator to readily and easily grease the gear mechanism and, because of the housing, the gear mechanism does not come into contact with sand, salt, snow, or ice. As a result, the torque load binder tends to be quicker and easier to operate under a range of different conditions. Furthermore, because a hand-held drill is used to rotate the gear mechanism, the operator is able to tighten chains to a much greater extent than is possible with lever or ratchet load binders. Because the initial chain tightening is greater, because the chains are not twisted as they tighten but are simply drawn towards each other, and because the handle of the disclosed torque load binder is a reaction lever, chains remain tight around the load even when the vehicle travels over bumpy roads. As a result, there is less need for an operator to repeated stop and check the tension in the chains and this in turn reduces the overall cost of operation.

One issue experienced by operators of the torque load binder disclosed in U.S. patent application Ser. No. 17/093,729 is that they have to use a decently powerful hand-held drill to actuate the gear mechanism. If the drill is not powerful enough, then the drill will fail to allow the operator to tighten chains to a sufficient degree to ensure they remain under proper tension and don't loosen as the vehicle travels over the road.

SUMMARY

The dual drive torque load binder disclosed herein addresses the issue in previously known torque load binders of requiring a powerful hand-held drill to actuate the same.

The dual drive torque load binder disclosed herein is capable of changing the tension in a tie-down such as a chain or strap securing a load to a vehicle or a support surface. The load binder includes a housing with an internal gear mechanism and a connector mechanism operatively engaged with the gear mechanism and extending outwardly from the housing. A high speed first driveshaft and a lower speed second driveshaft on the load binder are selectively individually actuated to effect movement between first and second end linkages of the connector mechanism. The first driveshaft effects movement between the first and second end linkages at a first speed and the second driveshaft effects movement between the end linkages at a lower second speed. Rotation of either of the first or second driveshafts actuates the connector mechanism, changing the distance between the first and second end linkages, and thereby changing the tension in the tie-down.

In one aspect, an exemplary embodiment of the present disclosure may provide a load binder comprising a housing; a gear mechanism retained within the housing; a connector mechanism operatively engaged with the gear mechanism and extending outwardly from the housing, said connector mechanism including a first end linkage and a second end linkage spaced a distance apart from each other; wherein each of the first end linkage and the second end linkage is adapted to be engaged with a tie-down region to retaining a load on a surface; a first driveshaft coupled to the gear mechanism; and a second driveshaft coupled to the gear mechanism; wherein each of the first driveshaft and the second driveshaft is separately actuatable to drive the gear mechanism and thereby change the distance between the first end linkage and the second end linkage of the connector mechanism; and wherein each of the first driveshaft and the second driveshaft is adapted to be selectively actuated by a powered hand-held drill.

In another aspect, an exemplary embodiment of the present disclosure may provide a method of adjusting tension in a tie-down member used to secure a load to a vehicle or a support surface, said method comprising providing a load binder having a connector mechanism operatively engaged with a gear mechanism provided in a housing of the load binder; wherein the connector mechanism extends outwardly from the housing and includes a first end linkage and a second end linkage and is actuated via the gear mechanism; providing a first driveshaft on the load binder configured to actuate the connector mechanism at a first speed; providing a second driveshaft on the load binder configured to actuate the connector mechanism at a second speed that is different from the first speed; engaging the first end linkage with a first region of the tie-down member; engaging the second end linkage with another region of the tie-down member or with a securement region on the vehicle, the support surface, or the load; selecting one of the first driveshaft and the second driveshaft for actuating the connector mechanism; engaging a powered hand-held drill with the selected one of the first driveshaft and the second driveshaft; actuating the drill; actuating the connector mechanism; changing a distance between the first end linkage and the second end linkage of the connector mechanism; and changing tension in the tie-down member as the distance between the first end linkage and second end linkage changes.

In another aspect, an exemplary embodiment of the present disclosure may provide a method of raising or lowering a landing gear, said method comprising providing a load binder having a connector mechanism operatively engaged with a gear mechanism provided in a housing of the load binder; engaging the connector mechanism to a rod extending outwardly from the landing gear, wherein the rod is part of an assembly in the landing gear that is adapted to move a landing gear foot towards or away from a ground surface; providing a first driveshaft on the load binder configured to actuate the connector mechanism at a first speed; providing a second driveshaft on the load binder configured to actuate the connector mechanism at a second speed that is different from the first speed; selecting one of the first driveshaft and the second driveshaft for actuating the connector mechanism; engaging a powered hand-held drill with the selected one of the first driveshaft and the second driveshaft; actuating the drill; actuating the connector mechanism; rotating the rod with the connector mechanism; actuating the assembly in the landing gear; and moving the landing gear foot one of towards the ground surface and away from the ground surface with the assembly.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure.

FIG. 13 is a left side elevation of the adapted dual torque load binder engaged with the landing gear and lowering the landing gear to contact the ground.

Similar numbers refer to similar parts throughout the drawings.

DETAILED DESCRIPTION

Figure 1:
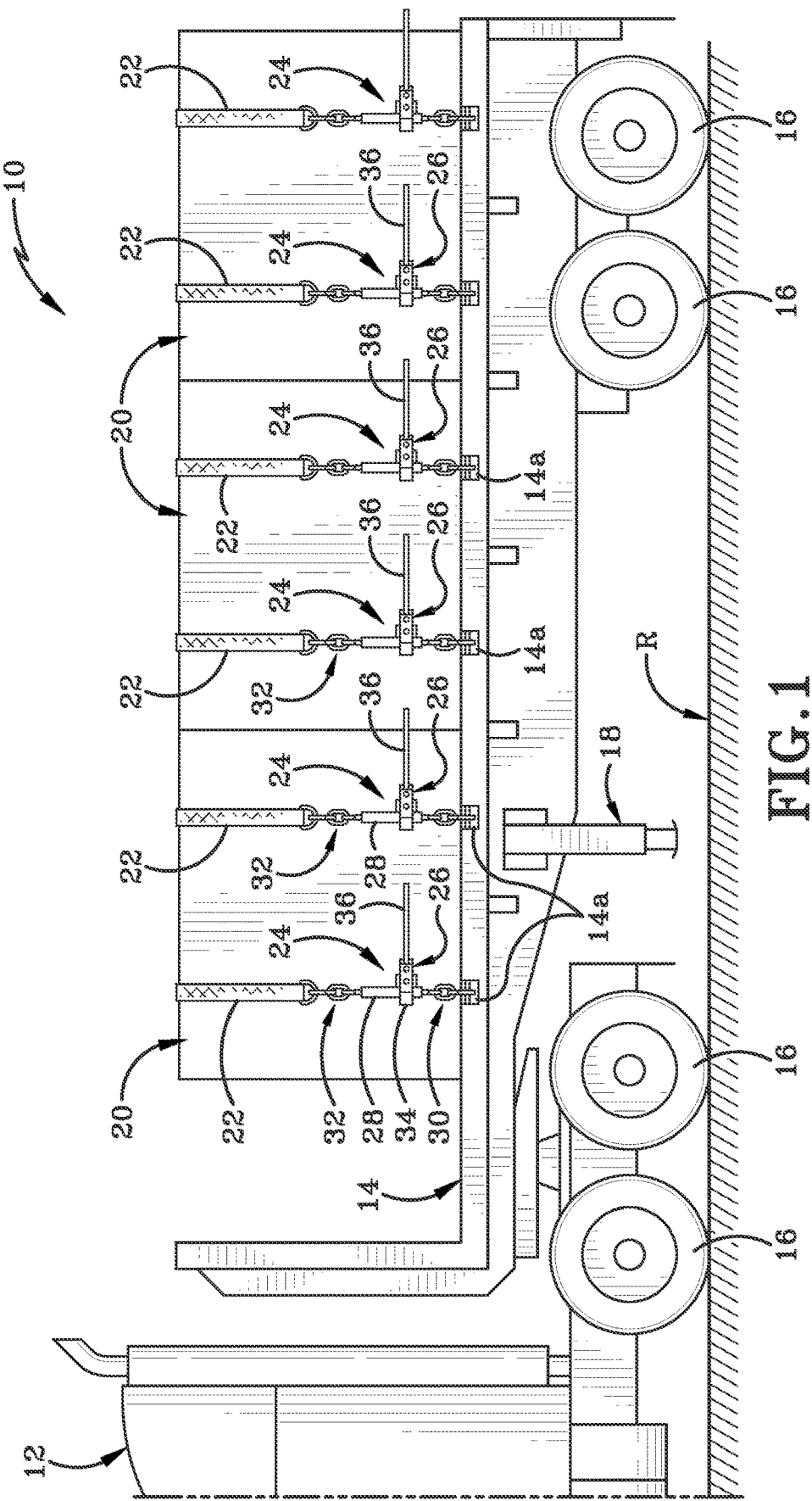
FIG. 1 is a partial left side elevation view of a tractor trailer carrying a load which is secured to the trailer using a plurality of dual drive torque load binders in accordance with an aspect of the present disclosure.

FIG. 1 shows part of a tractor-trailer 10 moving over a road surface "R". Tractor-trailer 10 includes a tractor 12 that is shown towing a removable trailer 14. A plurality of wheels 16 are provided on tractor 12 and on trailer 14. Trailer 14 is also provided with landing gear 18 that may be deployed when trailer 14 is unhitched from tractor 12 in order to support the front end of the trailer 14. Trailer 14, as illustrated, is a flatbed trailer and FIG. 1 shows a load 20 carried on the flatbed and secured thereto by a plurality of straps 22. A first end of each strap 22 is hooked to a securement point 14a on a left hand side of the flatbed, passes over a top of load 20, and a second end of the strap is secured to another securement point (not shown) on a right hand side of the flatbed. In particular, the first end of the strap 22 is operatively engaged with the securement point 14a by way of a dual drive torque load binder in accordance with the present disclosure, generally indicated by the reference character 24. The term "tie-down region" will be used herein to denote any type of connection location on a chain, a strap, a cable, on a vehicle, support platform, or even on a piece of heavy equipment which is being carried on a vehicle or support platform.

It will be understood that tractor-trailer 10 is exemplary of any vehicle or vessel upon which a load may be carried. The vehicle or vessel may be a vehicle or vessel that moves over the land, or that moves over a body of water, or that moves through the air. Additionally, it should be understood that tractor-trailer 10 is also exemplary of any other type of support surface upon which a load or piece of equipment stands and to which that load or piece of equipment needs to be secured. For example, the support surface may be a pallet upon which a load is placed and to which the load may need to be secured. It should be understood that the terms "vehicle", "vessel", "tractor-trailer", "support", and "support-surface" may be used interchangeably herein. Furthermore, use of the terms "vehicle", "tractor-trailer", "support", or "support surface" used herein should be understood to cover any and all vehicles, vessels, or support surfaces to which a load needs to be secured.

It should further be understood that the load 20 illustrated in FIG. 1 is exemplary of a load that is carried by or supported upon a surface and which needs to be secured to or tied down with respect to the surface. The term "load" should be understood in this specification to cover any type, shape, or size load.

It should further be understood that the straps 22 illustrated in FIG. 1 are exemplary of any type of tie-down member that may be used to secure a load to or with respect to a support surface. For example, the straps 22 may be replaced with chains or cables. The terms "strap", "chain", "cable", and "tie-down", may be used interchangeably herein and are to be understood to be indicative of any element suitable for this purpose. The dual drive torque load binder 24 may be engaged with a strap 22 at one end and some type of "securement element" or "securement point" on the vehicle 10 carrying the load 20.

Referring now to FIGS. 2 through 6, the dual drive torque load binder 24 in accordance with the present disclosure is shown in greater detail. For simplicity of description, the dual drive torque load binder 24 will be referred to herein as "load binder 24".

Figure 2:
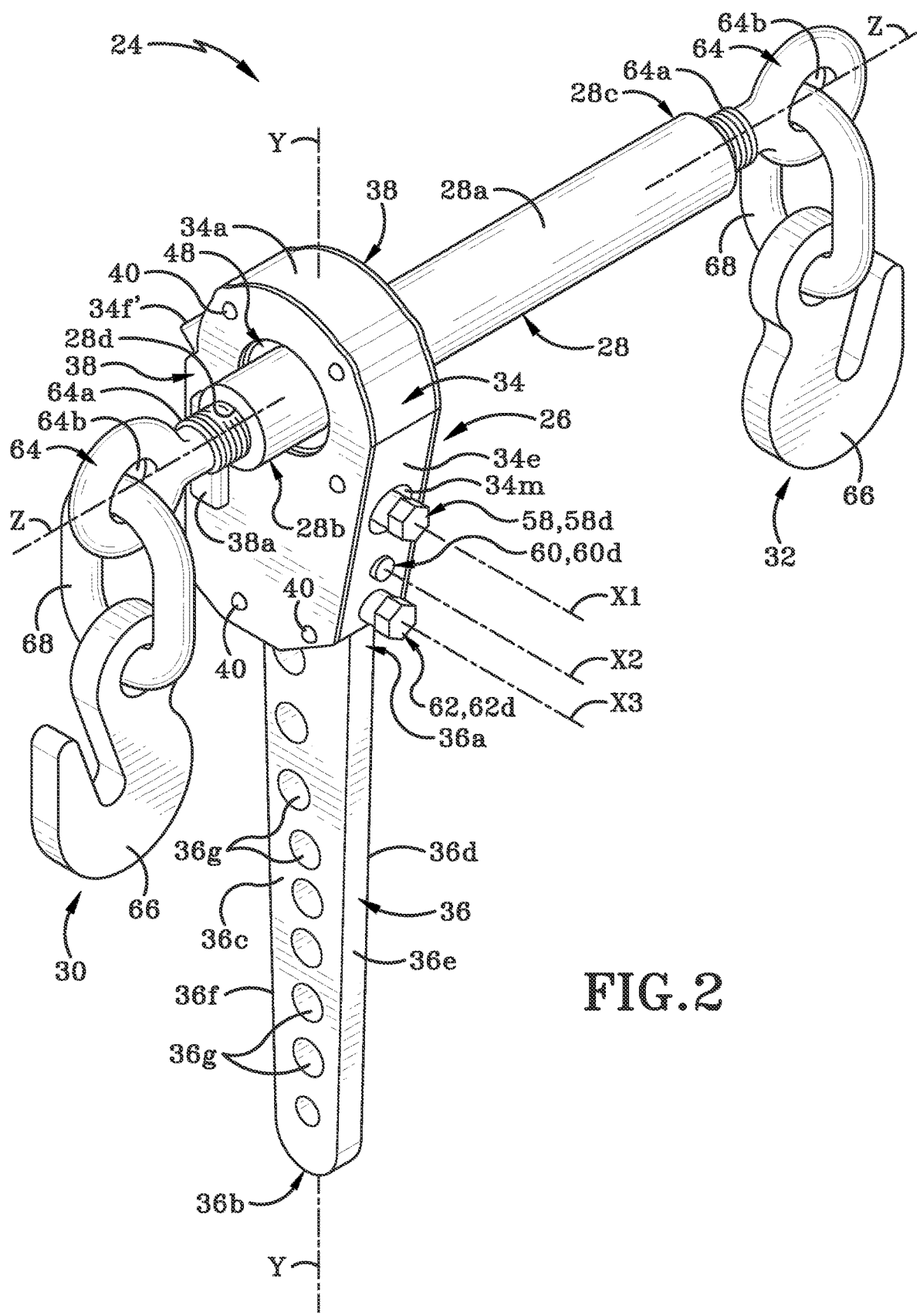
FIG. 2 is a top, front, left side isometric perspective view of a dual drive torque load binder in accordance with an aspect of the present disclosure shown on its own.

Load binder 24 comprises a body 26 and a connector mechanism that is engaged with body 26 and extends outwardly therefrom. As illustrated in FIGS. 1 and 2, the connector mechanism comprises a barrel 28, a first end linkage 30, and a second end linkage 32 that are operatively engaged with each other. The barrel 28 extends outwardly from body 26 along a lateral axis "Z" and in a first direction and a second direction away from body 26. As will be discussed in detail later herein, load binder 24 also includes a gear mechanism that is provided on the body 26. The gear mechanism comprises a worm gear mechanism and a spur gear mechanism that are operatively engaged with one another. The gear mechanism is coupled to the connector mechanism and drives the same. In particular, the worm gear mechanism is engaged with the barrel 28 of the connector mechanism. The first and second end linkages 30, 32 of the connector mechanism are adapted to be selectively engaged with tie-down regions in order to secure load 20 on vehicle 10 or another support surface. FIG. 1 shows that the tie-down regions with which the first and second end linkages 30, 32 are engaged are a link at one end of the chain or strap 22 and one of the securement points 14a on vehicle 10. As will be later described herein, the gear mechanism of the load binder 24 is selectively actuated to either increase or decrease the tension in the chain or strap 22 by actuating the connector mechanism. When tension is increased, the chain or strap 22 is tightened around the load 20, thereby more securely retaining the load 20 on trailer 14. When tension is decreased, the chain or strap 22 is loosened around the load 20 so that the load 20 may be removed from trailer 14.

Figure 5:
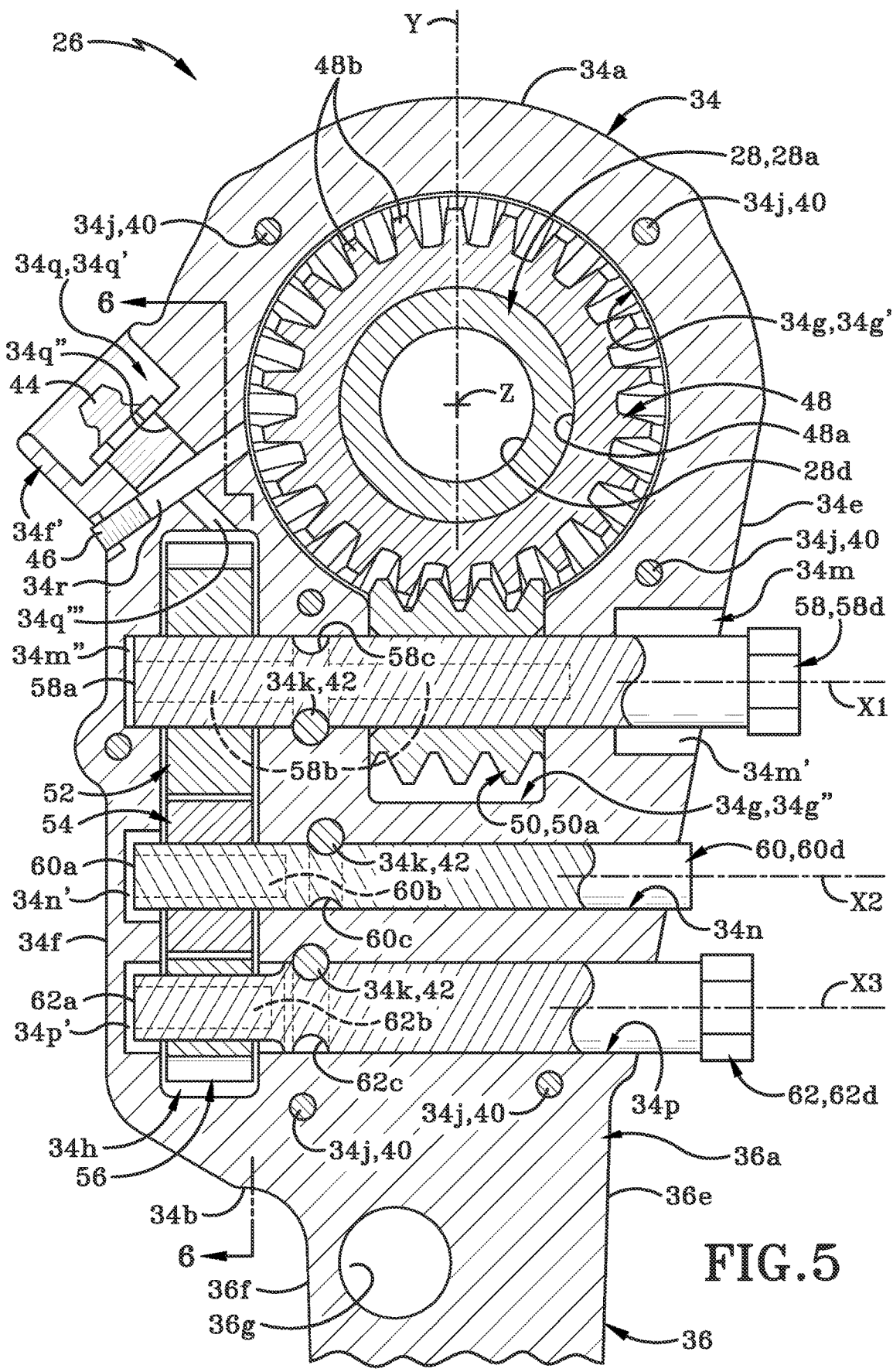
FIG. 5 is a longitudinal cross-section of the dual drive torque load binder taken along line 5-5 of FIG. 4.

The various components of load binder 24 will now be described in greater detail with reference particularly to FIGS. 1-6. Body 26 of load binder 24 comprises a housing 34, a handle 36 and a pair of opposed cover plates 38 that are secured to housing 34. Housing 34 and the covers 38 bound and define a housing interior within which a gear mechanism is retained, as will be further described herein. FIG. 5 shows housing 34 and handle 36 together comprise an integrally formed, monolithic, or unitary component. Body 26 is fabricated from a material having sufficient strength to function in rigorous environments. One suitable material for this purpose is a metal such as steel. The metal should be strong and tend not to corrode with exposure to the elements.

As best seen in FIGS. 5 and 2, housing 34 is generally rectangular in shape and handle 36 is generally V-shaped and extends outwardly from a bottom region of housing 34. Housing 34 includes an arcuate top 34a, a bottom 34b, a left side 34c, a right side 34d, a front 34e, and a back 34f. A plurality of apertures and openings are defined in housing 34. A first aperture 34g and a second aperture 34h are defined in housing 34 and extend between left side 34c and right side 34d. First aperture 34g is generally keyhole-shaped when housing 34 is viewed from the left side or right side and is located generally centrally located between front 34e and back 34c of housing 34. First aperture 34g includes a generally circular region 34g' and a generally rectangular region 34g". The circular region 34g' has a radius of curvature that is substantially similar to the radius of curvature of the arcuate top 34a. Circular region 34g' is located a short distance vertically downwardly from top wall 34a. The generally rectangular region 34g" extends vertically downwardly from a central bottom region of the circular region 34g'.

Body 26 has a longitudinal axis "Y" (FIGS. 2 and 5) that extends between top 34a of housing 34 and a bottom end of handle 36. Lateral axis "Z" extends through a center point of first aperture 34g and is oriented at right angles to longitudinal axis "Y". Barrel 28 of the connector mechanism is concentric with lateral axis "Z" and is therefore oriented at right angles to longitudinal axis "Y". Barrel 28 may be positioned relative to body 26 in such a way that equal lengths of barrel 28 project outwardly from the left side 34c and the right side 34d of housing. Alternatively, as illustrated in the attached figures, a greater length of barrel 28 may extend outwardly from the right side 34d and a smaller length of barrel 28 may extend outwardly from the left side 34c, or vice versa.

Second aperture 34h defined in housing 34 is generally rectangular when housing 34 is viewed from the left side or right side. Second aperture 34h is elongated and generally parallel to the longitudinal axis "Y" (FIG. 5) of body 26. Second aperture 34h is located between the rectangular region 34g" of first aperture 34g and back 34f of housing 34.

A plurality of first holes 34j is defined in each of the left side 34c and right side 34d of housing 34. These first holes 34j extend for a distance into the housing 34 but do not extend all the way to the opposing side of housing 34. Each first hole 34j is provided to receive a fastener 40 (FIG. 2) therethrough in order to secure cover plate 38 to the associated left side 34c or right side 34d of housing 34. The number and placement of the first holes 34j may be other than illustrated in FIG. 3.

A plurality of second holes 34k is defined in the left side 34c of housing 34. Each second hole 34k extends for a distance inwardly from left side 34c and may either terminate in right side 34d or proximate right side 34d. In particular, housing 34 defines three second holes 34k. Each second hole 34k is located so as to receive a locking pin 42 (FIG. 3) therein. The purpose of locking pins 42 will be discussed later herein.

Housing 34 further defines a plurality of tubes that are oriented at parallel to the left and right sides 34c, 34d. Housing 34 defines a first tube 34m, a second tube 34n, and a third tube 34p therein. As best seen in FIG. 5, each of the first, second, and third tubes 34m, 34n, 34p extends from an opening defined in front 34e of housing 34 and extends rearwardly through the housing, terminating a short distance inwardly from back 34f of housing 34. First tube 34m has a large diameter first region 34m' and then is of a substantially constant smaller diameter though to an end wall 34m" located inwardly from back 34f. First tube 34m originates in an opening to the first region 34m' in front 34e and extends rearwardly, intersecting intersects the rectangular region 34g" of first aperture 34g, and subsequently intersecting the second aperture 34h. Second tube 34n is located a distance vertically below first tube 34m and is of a substantially constant diameter from an opening in front 34e of housing through to an enlarged region 34n' proximate rear 34f of housing 34. Second tube 34n is located a distance vertically below the rectangular region 34g" of first aperture 34g but intersects the second aperture 34h a distance vertically below where first tube 34m intersections second aperture 34h. Third tube 34p is located a distance vertically below second tube 34n and is of a substantially constant diameter from an opening defined in front 34e of housing 34 through to an end region 34p' proximate rear 34f of housing 34. Third tube 34n extends rearwardly from an opening defined in front 34a of body and intersects second aperture 34h a distance vertically below where second tube 34n intersects second aperture 34h. The back wall 34m"' and enlarged regions 34n' and 34p' are located between second aperture 34h and back 34f of housing 34. FIG. 5 shows that first tube 34m (apart from the enlarged region 34m') and third tube 34p are of a substantially similar diameter. Second tube 34n (apart from the enlarged region 34n' is of a smaller diameter than first tube 34m and third tube 34n.

It should be noted that first tube 34m, second tube 34n, and third tube 34p are oriented substantially parallel to each other and at right angles to longitudinal axis "Y" of body 26. A first transverse axis "X1" extends along a centerline of first tube 34m, a second transverse axis "X1" extends along a centerline of second tube 34n, and a third transverse axis "X3" extends along a centerline of third tube 34p. First, second and third transverse axes "X1", "X2", and "X3" are parallel to each another and oriented at right angles to longitudinal axis "Y".

As best seen in FIG. 5, housing 34 defines a grease port 34q. Port 34q originates in back 34f of housing 34 and angles downwardly and inwardly towards an upper end of second aperture 34h. Port 34q includes a larger diameter first region 34q' that originates in an opening in rear 34f and extends downwardly and inwardly for a distance, a medium diameter second region 34q" that is extends downwardly and inwardly from first region 34q', and a smallest diameter channel 34q''' that extends between second region 34q" and second aperture 34h. Second region 34q" is internally threaded and a grease fitting 44 is threadingly engaged with the threads of second region 34q". A region 34f' of back 34f is configured to circumscribe first region 34q' of port 34q. This region 34f' of back 34f extends upwardly and rearwardly from a remaining portion of back wall 34f and is shaped to circumscribe and protect the grease fitting 44. Grease fitting 44 which is seated within first region 34q' may include a cap (not numbered) that can be opened to introduce grease into channel 34q'''. Grease introduced through channel 34q''' will flow into second aperture 34h for a purpose that will be later described herein.

A slot 34r is defined in housing 34, extending between circular region 34g' of first aperture 34g and an opening defined in back 34e. Slot 34r angles downwardly and rearwardly from an opening into central region 34g' (see FIG. 3), intersecting one or both of second region 34q" and channel 34q''', and terminating in an opening defined in back 34f of housing. A set screw 46 is engaged in the opening to channel 34q''' where that channel intersects back 34f. Set screw 46 acts as a plug to prevent grease introduced into grease fitting 44 from flowing outwardly through the opening to channel 34q''' in back 34f.

Referring to FIGS. 1 and 5, and as discussed earlier herein, handle 36 extends outwardly from housing 34 for a distance. Handle 36 may be generally V-shaped and includes a top end 36a where handle 36 extends outwardly from bottom 34b of housing 34. Handle 36 further includes a bottom 36b spaced a distance vertically away from top end 36a. Handle 36 also includes a left side 36c, a right side 36d, a front 36e, and a back 36f. Left side 36c and right side 36d are generally parallel to left side 34c and right side 34d of housing 34. Left and right sides 36c, 36d, front 36e, and back 36f together form a gently curved apex at bottom 36b of handle 36. The apex or bottom 36b is located a distance vertically below bottom 34b of housing 34.

A plurality of through-holes 36g are defined in handle 36 and extend between left side 36c and right side 36d. The through-holes 36g are located at intervals along handle 36 and are of various sizes and distances away from longitudinal axis "Y". The purpose of the variation in size and placement of holes 36g will become evident later herein.

Figure 3:
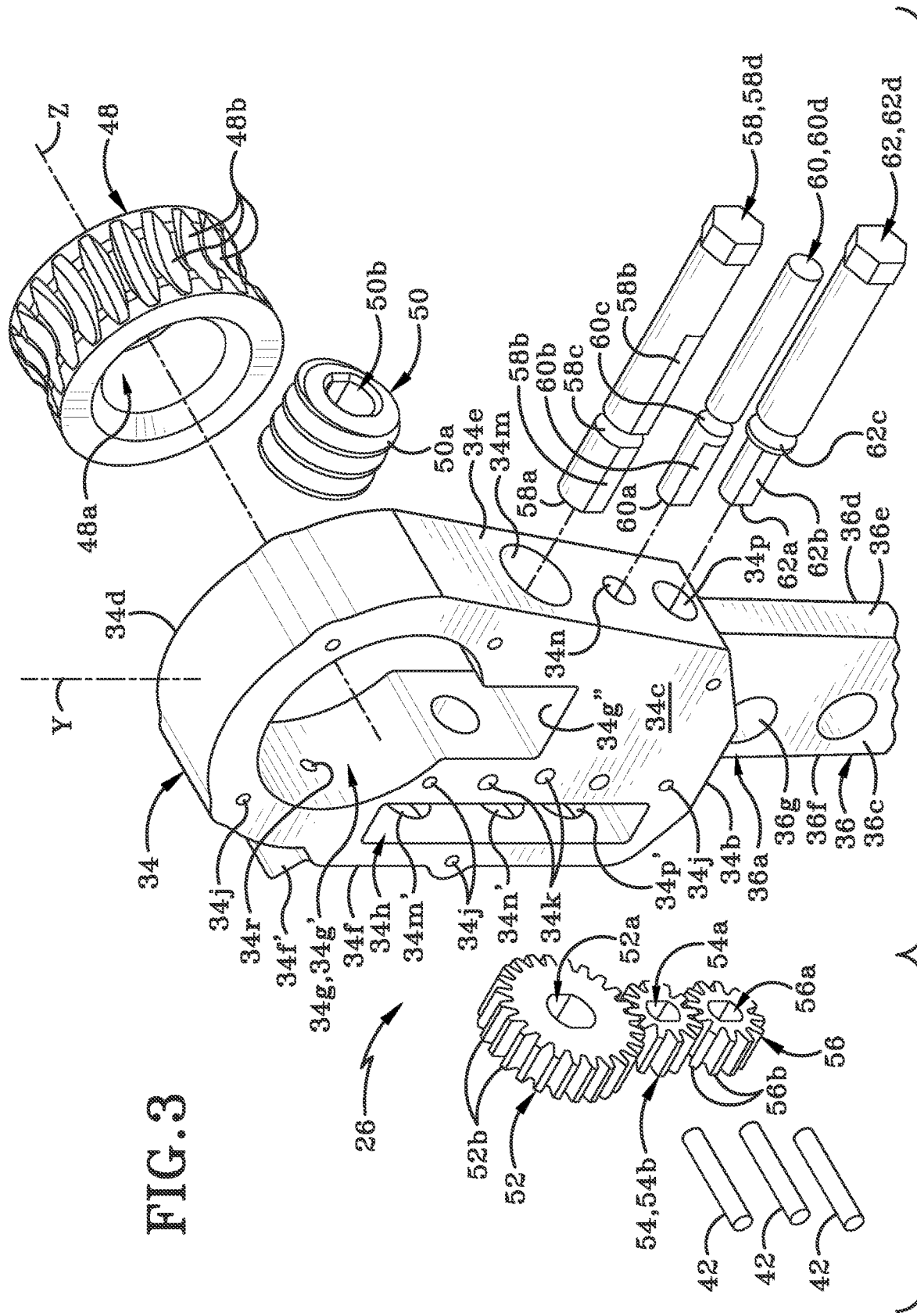
FIG. 3 is an exploded partial top, front, left side isometric perspective view of the body of the dual drive torque load binder of FIG. 2 with the cover plates removed for clarity of illustration.
Figure 4:
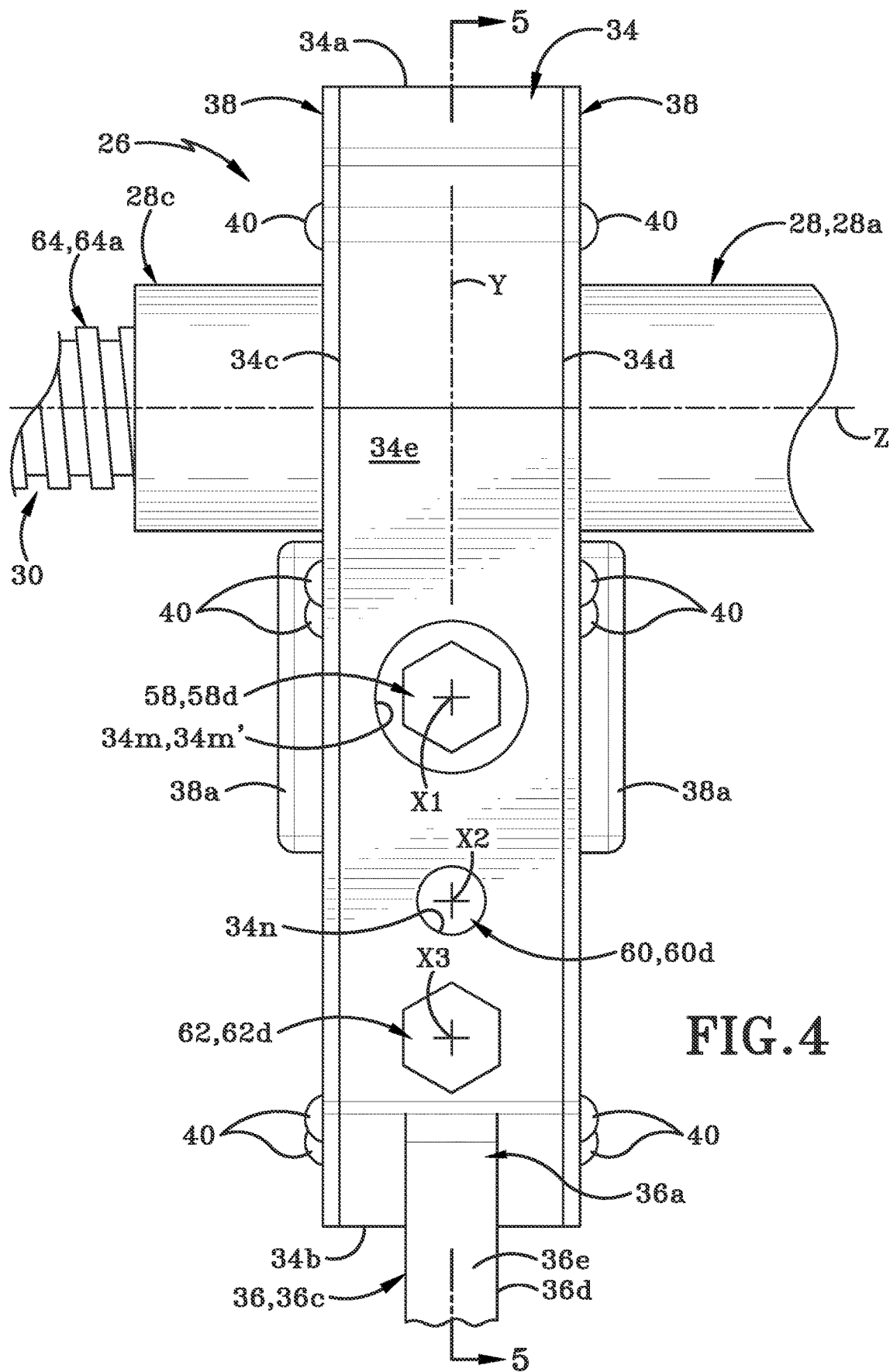
FIG. 4 is a partial front elevation view of the dual drive torque load binder.

Referring to FIG. 3, the worm gear mechanism discussed earlier herein is located within an interior of housing 34 and is comprised of a ring gear 48 and a worm gear 50 that are configured to mesh with each other. Ring gear 48 is seated within circular region 34g' of first aperture 34g of housing 34 and worm gear 50 is seated within rectangular region 34g" of first aperture 34g of housing 34. Ring gear 48 defines a central hole 48a therein that circumscribes lateral axis "Z". Central hole 48a is shaped and sized to receive barrel 28 (FIG. 1) of the connector mechanism therethrough. Ring gear 48 includes a plurality of radially-extending teeth 48b that are configured to mesh with the helical flight 50a of worm gear 50. Worm gear 50 defines a through hole 50b that is similarly shaped and sized to the first tube 34m defined in housing 34. When worm gear 50 is seated in rectangular region 34g" of first aperture 34g, hole 50b in worm gear 50 is aligned with first tube 34m and circumscribes first transverse axis "X1".

As indicated earlier herein, the gear mechanism provided in load binder 24 also includes a spur gear mechanism. The spur gear mechanism is operatively coupled to the worm gear mechanism described above and comprises a plurality of spur gears and two separate driveshafts that are capable of being separately actuated in order to drive the worm gear mechanism. The components of the spur gear mechanism will now be described in greater detail. The spur gear mechanism includes a first spur gear 52 and a second spur gear 56. A third spur gear 54 is interposed between the first spur gear 52 and the second spur gear 56. The first spur gear 52, second spur gear 56, and third spur gear 54 are all received within second aperture 34h defined in housing 34. It will be understood that while a third spur gear 54 is illustrated as being included as part of the spur gear mechanism of load binder 24, the third spur gear 54 may be omitted from the spur gear mechanism. In other embodiments, further spur gears in addition to the third spur gear 54 may be interposed between first spur gear 52 and second spur gear 56. The number of gears selected for use in load binder 24 will depend on the desired gear ratio of the device.

Figure 6:
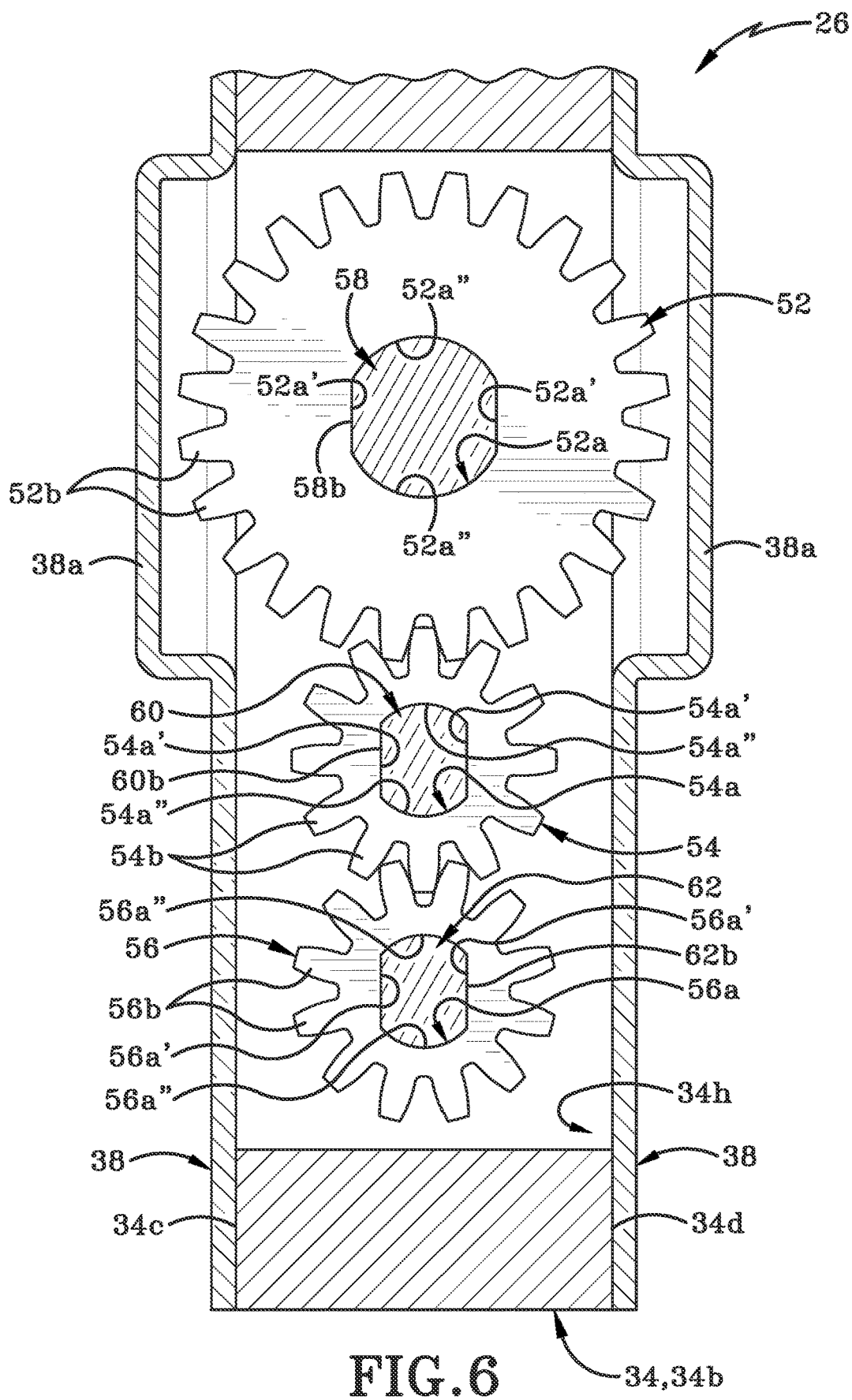
FIG. 6 is a longitudinal cross-section of the dual drive torque load binder taken along line 6-6 of FIG. 5.

As illustrated herein, first spur gear 52 is a high range gear and second spur gear 56 is a low range gear. FIG. 6 shows that first spur gear 52 is of a substantially greater exterior diameter than an exterior diameter of second spur gear 56. Third spur gear 54 is illustrated as being of substantially a same exterior diameter as second spur gear 56 but it will be understood that third spur gear 54 may be of a greater exterior diameter than second spur gear 56 or a smaller exterior diameter than second spur gear 56. It will further be understood that the diameters of first spur gear 52 and second spur gear 56 are exemplary and the diameters may be other than illustrated.

Referring to FIG. 6, first spur gear 52 defines a central hole 52a therein and includes a plurality of radially extending teeth 52b on the gear's outer circumference. As can readily be seen from this figure, central hole 52a is not circular in cross-section but instead includes two opposing flat regions 52a' and two opposing arcuate regions 52a". Third spur gear 54 defines a central hole 54a therein and includes a plurality of radially extending teeth 54b on the gear's outer circumference. Central hole 54a is not circular in cross-section but instead includes two opposing flat regions 54a' and two opposing arcuate regions 54a". Second spur gear 56 defines a central hole 56a therein and includes a plurality of radially extending teeth 56b on the gear's outer circumference. Central hole 56a is not circular in cross-section but instead includes two opposing flat regions 56a' and two opposing arcuate regions 56a".

It should be understood that the "high range" first driveshaft 58 and "high range" first spur gear 52 are configured such that the first driveshaft 58 is operable as a higher speed driveshaft. Furthermore, the "low range" second driveshaft 62 and "low range" second spur gear 56 are configured such that the second driveshaft 62 is operable as a lower speed driveshaft. When actuated via a hand-held powered drill 70, first driveshaft 58 will operate at a higher speed and effect motion in the connector mechanism 28, 30, 32 at a first speed. Second driveshaft 62 when actuated by drill 70 will operate at a lower speed and effect motion in the connector mechanism at a second speed that is lower than the first speed.

A suitable high powered hand-drill 70 that is capable of actuating the first driveshaft 58 and second driveshaft 62 is an 18 volt to 20 volt drill or a drill that delivers about 800 W to 850 W, such as the DEWALT® DCD991P2 (DEWALT is a registered trademark of The Black & Decker Corporation of Towson, Md., U.S.). Lowered powered hand-drills 70 are also capable of actuating the first driveshaft 58 and the second driveshaft 62. Such lower powered hand-drills may include any standard drill that puts about 320 power watts out. Such lower power drills deliver about 2.5 times less torque than the higher power drills referenced above.

Referring still to FIG. 6, first spur gear 52 is located towards an upper end of second aperture 34h of housing 34, third spur gear 54 is located vertically below first spur gear 52 such that the teeth 54b of third spur gear 54 mesh with teeth 52b of first spur gear 52. Second spur gear 56 is located vertically below third spur gear 54 in second aperture 34h and in such a way that teeth 56b of second spur gear 56 mesh with teeth 54b of third spur gear 54. The central hole 52a of first spur gear 52 is aligned with first tube 34m and circumscribes first transverse axis "X1". As a consequence, central hole 52a of first spur gear 52 is transversely aligned with the hole 50b of worm gear 50.

The spur gear mechanism also includes a high range first driveshaft 58 is inserted into first tube 34m defined in housing 34. First driveshaft 58 is of a substantially complementary diameter to first tube 34m so as to be received therein. When first driveshaft 58 is received within first tube 34m, the first driveshaft 58 extends along first transverse axis "X1". A first end 58a of first driveshaft 58 is inserted through enlarged first region 34m of first tube 34m, passes through hole 50b of worm gear 50 seated in first aperture 50 and subsequently passes through central hole 52a of first spur gear 52 that is seated in second aperture 34h. A circumferential surface of first driveshaft 58 is provided with flat areas 58b that extend longitudinally along the surface away from first end 58a. The flat areas 58b are aligned with the flat regions 52a' of the hole 52a defined in first spur gear 52. This arrangement ensures that if first driveshaft 58 is rotated in a first direction or a second direction (as will be described later herein), first spur gear 52 will rotate in unison with first driveshaft 58. When first driveshaft 58 is received in first tube 34m, the first end 58a of first driveshaft 58 is seated proximate end wall 34m" of first tube 34m. An annular groove 58c is defined in the circumferential surface of first driveshaft 58 a distance away from first end 58a. In particular, annular groove 58c is located so as to align with one of the second holes 34k defined in housing 34. In particular, groove 58c will align with the uppermost of the second holes 34k that intersects first tube 34m. A first one of the locking pins 40 is introduced into the uppermost second hole 34k and becomes seated in annular groove 58c. This arrangement ensures that first driveshaft 58 cannot be withdrawn from first tube 34m.

As can be seen from FIG. 5, when first driveshaft 58 is received within first tube 34m a length of first driveshaft 58 extends for a distance outwardly beyond front 34e of housing 34. Nut 58d at the end of first driveshaft 58 is located this distance outwardly beyond front 34e of housing 34. The enlarged region 34m' of first tube 34m forms a countersunk bore that circumscribes a portion of the circumference of first driveshaft 58 located rearwardly of nut 58d. The purpose of the countersunk bore will be later described herein.

A shaft 60 of complementary diameter to second tube 34n is provided for insertion into second tube 34n. Shaft 60 is a non-driven shaft that engages third spur gear 54. When shaft 60 is received within second tube 34n, the shaft 60 extends along second transverse axis "X2". A first end 60a of shaft 60 is inserted through second tube 34n, passes through central hole 54a of third spur gear 54 that is seated in second aperture 34h. First end 60a of shaft 60 is seated in enlarged region 34n' of second tube 34n. A circumferential surface of shaft 60 is provided with flat areas 60b that extend longitudinally along the circumferential surface and away from first end 60a. The flat areas 60b are aligned with the flat regions 54a' of the hole 54a defined in third spur gear 54. This arrangement ensures that if shaft 60 is rotated in a first direction or a second direction (as will be described later herein), third spur gear 54 will rotate in unison with shaft 60. An annular groove 60c is defined in the circumferential surface of shaft 60 a distance away from first end 60a. In particular, annular groove 60c is located so as to align with one of the second holes 34k defined in housing 34. In particular, groove 60c will align with the middle one of the second holes 34k that intersects second tube 34n. A second one of the locking pins 40 is introduced into the middle second hole 34k and becomes seated in annular groove 60c. This arrangement ensures that shaft 60 cannot be withdrawn from second tube 34n. When shaft 60 is received in second tube 34n, a second end 60d thereof extends for a very short distance outwardly beyond front 34e of housing 34. The reason that second end 60d extends beyond front 34e is so that if, for some reason, shaft 60 needs to be removed from housing 34, the second end 60d thereof can be grasped with a pair of pliers and the shaft 60 can be pulled out of second tube 34n (obviously only after removal of the middle locking pin 40.

A low range second driveshaft 62 is inserted into third tube 34p defined in housing 34. Second driveshaft 62 is of a substantially complementary diameter to third tube 34p so as to be received therein. When second driveshaft 62 is received within third tube 34p, the second driveshaft 62 extends along third transverse axis "X3". A first end 62a of second driveshaft 62 is inserted through an opening to third tube 34p defined in front 34e, passes through central hole 56a of second spur gear 56 that is seated in second aperture 34h. A circumferential surface of second driveshaft 62 is provided with flat areas 62b that extend longitudinally along the surface away from first end 62a. The flat areas 62b are aligned with the flat regions 56a' of the hole 56a defined in second spur gear 56. This arrangement ensures that if second driveshaft 62 is rotated in a first direction or a second direction (as will be described later herein), second spur gear 56 will rotate in unison with second driveshaft 62. When second driveshaft 62 is received in third tube 34p, the first end 62a of second driveshaft 62 is seated in end region 34p' of third tube 34p. An annular groove 62c is defined in the circumferential surface of second driveshaft 62 a distance away from first end 62a. In particular, annular groove 62c is located so as to align with one of the second holes 34k defined in housing 34. In particular, groove 62c will align with the lowermost of the second holes 34k that intersects third tube 34p. A third one of the locking pins 40 is introduced into the lowermost second hole 34k and becomes seated in annular groove 62c. This arrangement ensures that second driveshaft 62 cannot be withdrawn from third tube 34p.

As can be seen from FIG. 5, when second driveshaft 62 is received within third tube 34p a length of second driveshaft 62 extends for a distance outwardly beyond front 34e of housing 34. A nut 62d is provided at this second end of the second driveshaft 62 and the nut 62d is located this distance outwardly beyond front 34e of housing 34.

Referring to FIG. 6, it can be seen that first spur gear 52 is of an exterior diameter that is greater than the width of housing 34, where the width of housing 34 is measured between left side 34c and right side 34d thereof. As a result, the first spur gear 52 projects outwardly for a distance beyond each of the left side 34c and right side 34d. As mentioned earlier herein, body 26 includes cover 38 that are engaged with the left side 34c and the right side 34d in order to enclose and therefore protect the ring gear 48, worm gear 50, first spur gear 52, third spur gear 54, and second spur gear 56. In order to accommodate the larger diameter of the first spur gear 52, each of the covers 38 includes a projection 38a that extends substantially for the overall height and width of the first spur gear 52. The projection 38a can be seen in FIG. 2 extending for a distance outwardly beyond the rest of cover 38. In particular, projection 38a has a vertical height that is slightly larger than the diameter of the first spur gear 52. The rest of the cover 38 (i.e., other than this projection 38a) is substantially planar. Cover 38 has an exterior perimeter that is complementary to the exterior perimeter of the left side 34c or right side 34d. As mentioned previously herein, the covers 38 are secured to left side 34c and right side 34d by means of fasteners 40 that are inserted through holes defined in the cover and into aligned first holes 34j defined in housing 34. The covers 38 and housing 34 together define an interior within which the gear mechanism is retained in such a way that dirt, ice, snow, etc. are prevented from contacting the gear mechanism. Additionally, because the port 34q and slot 34r place grease fitting 44 are in fluid communication with the interior defined by covers 38 and housing 34, the gear mechanism housed within the interior is readily and easily greased and is therefore always ready for operation.

Referring to FIGS. 2 and 5, barrel 28 comprises a cylindrical tube 28a that has a first end 28b, a second end 28c. The exterior circumference of barrel 28 is complementary to the central hole 48a of ring gear 48. Barrel 28 defines a central bore 28d that extends from an opening defined in first end 28b through to an opening defined in second end 28c. At least end portions of the interior surface of barrel 28 that defines bore 28d are threaded. End linkages 30, 32 are operatively engaged with barrel 28. Each end linkage incudes a heavy gauge eye bolt 64, hook 66, and chain link 68. Each eye bolt 64 includes an exteriorly-threaded shaft 64a and an eye 64b. The threaded shaft 64a is complementary in diameter to the bore 28d of barrel 28. The eye bolt 64 of each end linkage 30, 32 is engaged in the bore 28d of barrel 28 at one or the other of the first end 28b or second end 28c of barrel 28. The chain link 68 secures hook 66 to the eye 64b of the eye bolt 64. It will be understood that instead of a single chain link 68, each end linkage 30, 32 may include more than one chain link 68 disposed between hook 66 and eye bolt 64.

Load binder 24 is used in the following manner. Referring to FIGS. 1, 2, and 7-9, when it is desired to secure load 20 to vehicle 10, the operator will pass one or more chains or straps 22 over the load 20. The operator will then secure each end of each chain or strap 22 to the vehicle using the load binder 24. It should be understood that in the scenario illustrated in FIG. 1, each chain or strap 22 will have a load binder 24 interposed between each end of the chain or strap and the vehicle 10; so two load binders 24 will be engaged with each strap 22. In other instances, not illustrated herein, the chain or strap 22 will be wrapped around the load 20 or a portion of the load and the chain or strap 22 will be secured back to itself using a single load binder 24. In order to engage the load binder 24 with one end of the strap as illustrated in FIG. 1, the hook 66 on the first end linkage 30 will be engaged with a securement point 14a on vehicle 10. The hook 66 on the second end linkage 32 will be engaged with a link on the first end of the strap 22.

Figure 10:
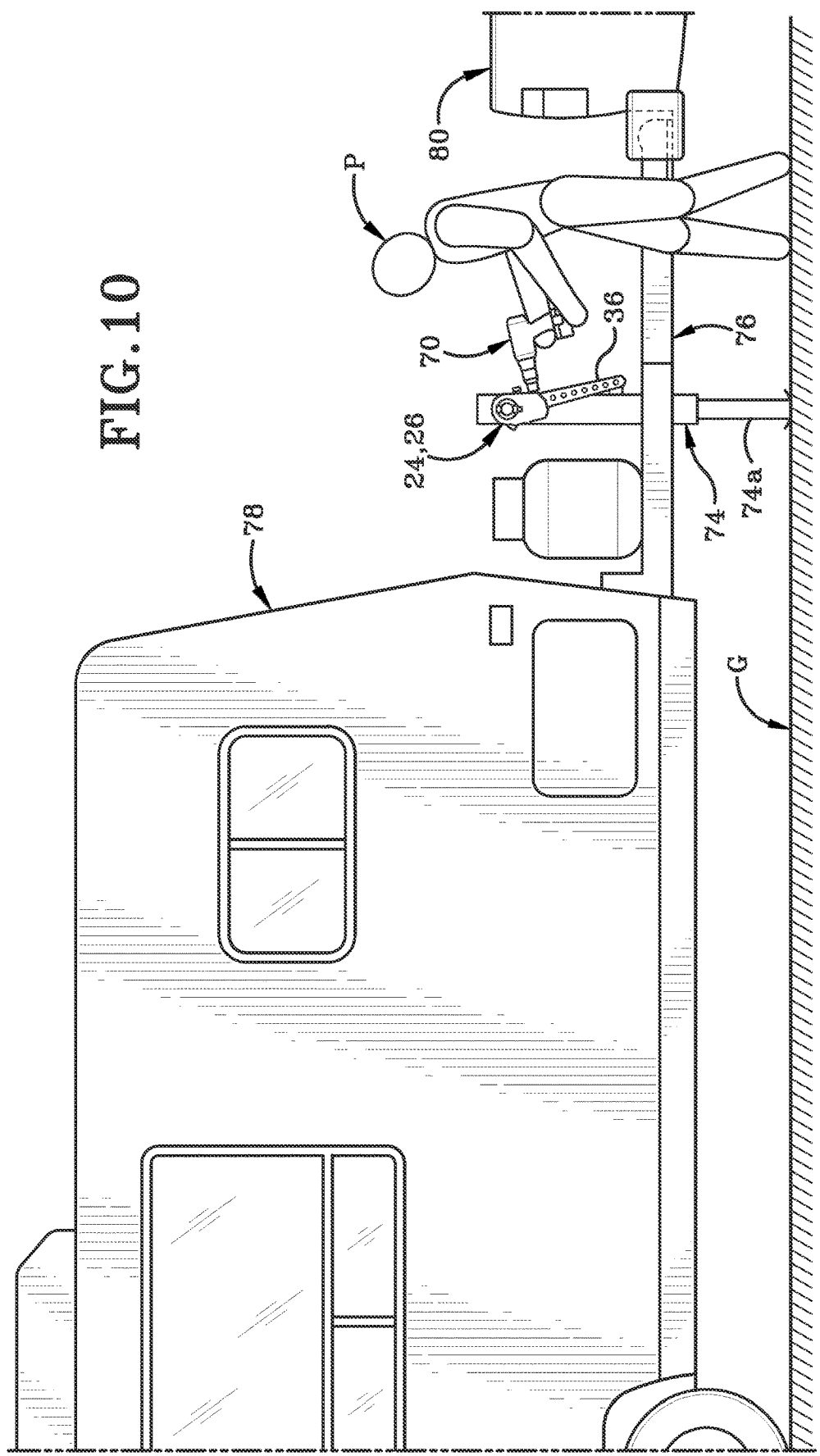
FIG. 10 is a diagrammatic left side elevation view of recreational vehicle connected to a towing vehicle via a tow hitch and showing the dual drive torque load binder being used to actuating a landing gear of the tow hitch.

A hand-drill 70 (FIGS. 7 and 10) is then engaged with load binder 24 to actuate the gear mechanisms within the body 26 in order to tighten the strap 22 around the load. The operator may select to engage a socket 72 which is secured to a chuck 70a of the hand-drill 70 with the high range first driveshaft 58 (FIG. 7) or with the low range second driveshaft 62 (FIG. 8). The particular first driveshaft 58 or 62 that the operator selects may be based on the particular type of hand-drill 70 that is being used. If the hand-drill 70 is sufficiently powerful enough to be used to fully tighten the strap 22, then the operator may select to engage the socket 72 with the high range first driveshaft 58. If the hand-drill 70 is less powerful, then the operator may select to engage the socket with the low range second driveshaft 62. Either way, when the socket 72 is engaged with one of the driveshafts 58 or 62, the drill 70 is actuated to rotate the nut 58d or 62d.

Figure 7:
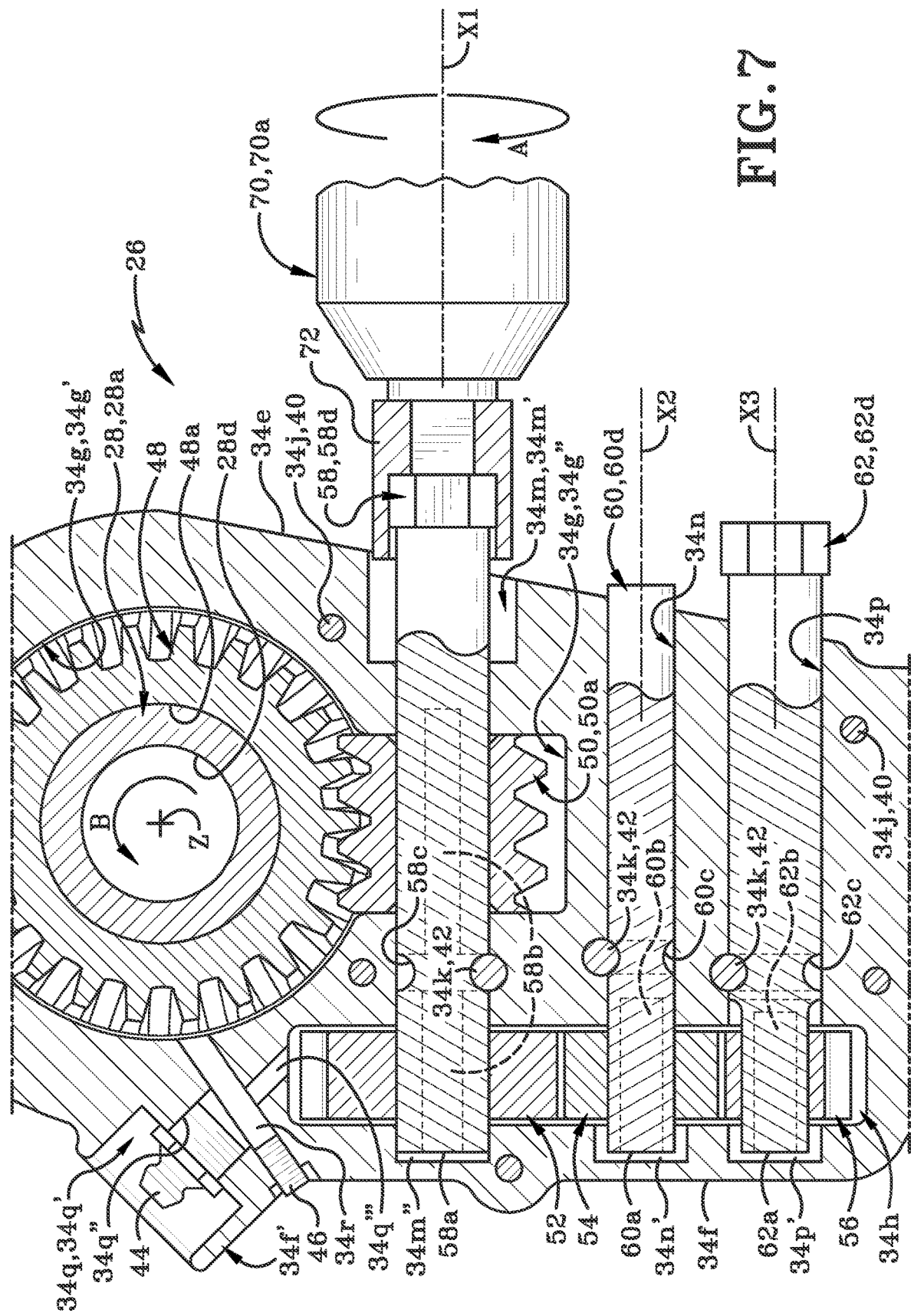
FIG. 7 is a longitudinal cross-section of the dual drive torque load binder similar to FIG. 5 and showing part of a hand-held drill engaged with a first of the two drives and actuated to impart rotation to the same.
Figure 8:
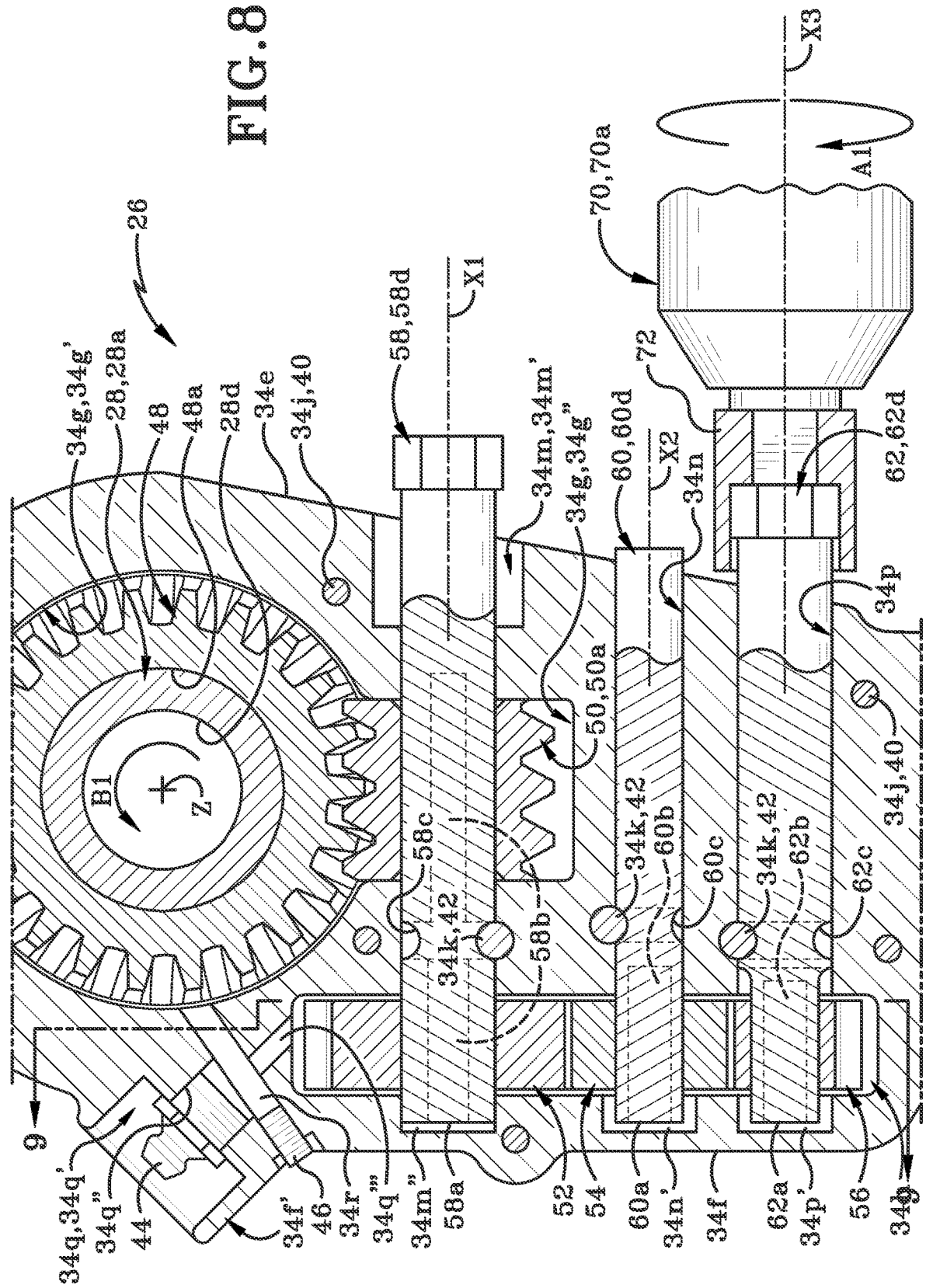
FIG. 8 is a longitudinal cross-section of the dual drive torque load binder similar to FIG. 5 and showing part of a hand-held drill engaged with a second of the two drives and actuated to impart rotation to the same.

In FIG. 7, socket 72 is engaged with the high range first driveshaft 58 and drill 70 causes first driveshaft 58 to rotate clockwise about first transverse axis "X1". The clockwise rotation of high range driveshaft 68 is indicated by arrow "A". High range driveshaft 58 is operatively engaged with worm gear 50 in such a way that the first driveshaft 58 and worm gear 50 will rotate in unison with each other. As a consequence, the clockwise rotation of high range first driveshaft 58 caused by actuation of drill 70 will, in turn, cause worm gear 60 to rotate in unison in a clockwise direction. Worm gear 60 is meshed with ring gear 48 and, therefore, as worm gear 60 rotates in a clockwise direction, ring gear 48 is caused to rotate counter-clockwise about the lateral axis "Z". This counter-clockwise rotation is indicated by arrow "B" in FIG. 7.

As mentioned earlier herein, barrel 28 is engaged within the ring gear 48 in such a way that the two components will rotate in unison. Consequently, as ring gear 48 rotates in a counter-clockwise direction in response to motion of worm gear 50, barrel 28 also rotates counter-clockwise about the lateral axis "Z" in the direction indicated by arrow "B". Since first and second end linkages 30, 32 are threadily engaged with barrel 28, rotation of barrel 28 causes a response motion in first and second end linkages 30, 32. Rotation of barrel 28 in the counter-clockwise direction "B" will tend to cause the eyes 64b of the two end linkages 30, 32 to be drawn inwardly towards each other along the lateral axis "Z". In other words, a distance between the two eyes 64b of the end linkages 30, 32 will get smaller. The end result of this is that, in FIG. 1, the first end of the strap 22 engaged with second end linkage 32 is drawn downwardly towards to securement point 14a. In other words, the strap 22 is tightened around the load. The operator will use hand-drill 70 to rotate high range first driveshaft 58 in a clockwise direction "A" until a desired tension is developed in strap 22. In summary, when drill 70 is used to individually drive one or the other of the first driveshaft 58 and second driveshaft 60 in a first direction (typically in a clockwise direction as indicated by arrows "A" and "A1" in FIGS. 7 and 8, respectively), each of the first end linkage 30 and the second end linkage 32 is caused to extend further outwardly from the associated first end 28b or second end 28c of the barrel 28 when the barrel 28 is rotated in a first direction "B" or "B1" (FIGS. 7 and 8) about the lateral axis "Z". When the drill 70 is used to individually drive one or the other of the first driveshaft 58 and second driveshaft 62 in a counter-clockwise direction, the first end linkage 30 and second end linkage 32 are caused to extend outwardly from the associated first end 28b or second end 28c of the barrel 28 to a lesser extent when the barrel 28 is rotated in a second direction, i.e., in an opposite direction to "B" and "B1" (FIGS. 7 and 8).

Figure 9:
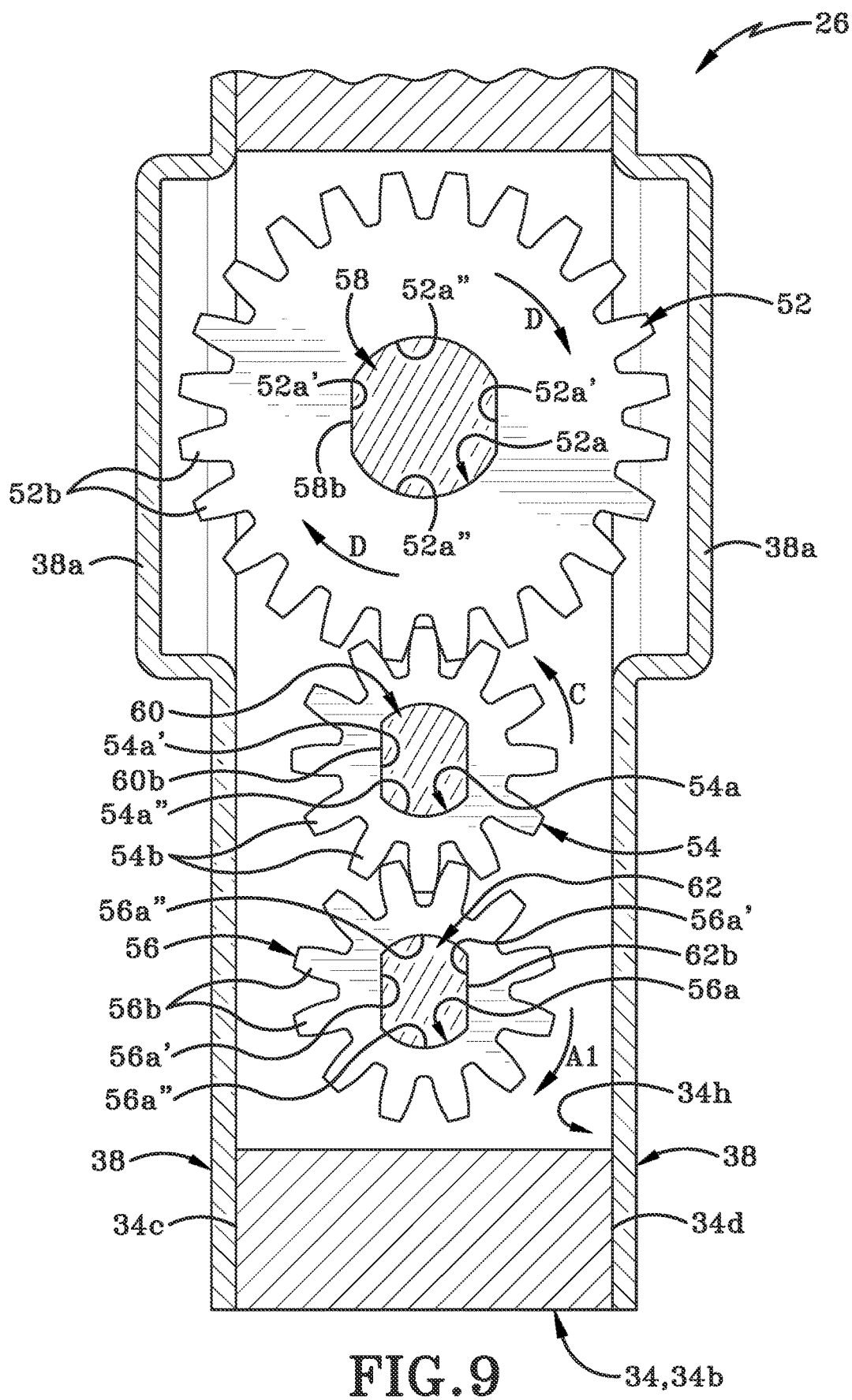
FIG. 9 is a longitudinal cross-section of the dual drive torque load binder taken along line 9-9 of FIG. 8.

If the drill 70 used by the operator is not sufficiently powerful enough to do rotate the high range first driveshaft 58 to a sufficient degree to develop the desired tension in strap 22, then the operator will engage the drill 70 with the low range second driveshaft 62. This situation is illustrated in FIGS. 8 and 9. As before, the operator will engage the socket 72 about the nut 62d at the end of low range second driveshaft 62 and will actuate the drill 70 to rotate second driveshaft 62 in a clockwise direction about the third transverse axis "X3". This clockwise direction is indicated by arrow "A1" in FIG. 8. Since second driveshaft 62 is operatively engaged with second spur gear 56 in such a manner that the two components will rotate in unison, when low range second driveshaft 62 is rotated in the clockwise direction "A1", second spur gear 56 is also rotated in the clockwise direction "A1". This is shown in FIG. 9. Second spur gear 56 is meshed with third spur gear 54 and therefore clockwise rotation of second spur gear 56 causes counter-clockwise rotation of third spur gear 54 about the second transverse axis "X2". This counter-clockwise rotation is indicated by arrow "C". Shaft 60 is operatively engaged with third spur gear 54 such that the two components will rotate in unison. As a consequence, counter-clockwise rotation of third spur gear 54 will also cause counter-clockwise rotation of shaft 60. (It will be understood that in other instances, since shaft 60 is non-driven, shaft 60 may be replaced both any other suitable mechanism that will permit third spur gear 54 to act as a change gear. For example shaft 60 may be replaced with a pin and roller bearings.)

Since third spur gear 54 is meshed with first spur gear 52, the counter-clockwise rotation "C" of third spur gear 54 will cause a clockwise rotation of first spur gear 52 about the first transverse axis "X1". The clockwise rotation of first spur gear 52 is indicated in FIG. 9 by arrow "D". This clockwise rotation of first spur gear 52 is then imparted to high range first driveshaft 58 because first spur gear 52 and high range first driveshaft 58 are configured to rotate in unison. The clockwise rotation of first driveshaft 58 in the direction of arrow "D" will be imparted to worm gear 50 and, as previously described, the clockwise rotation of worm gear 50 will cause counter-clockwise rotation in ring gear 48 and thereby in barrel 28. Counter-clockwise rotation of barrel 28, in turn, will causes the threadedly engaged end linkages 30, 32 to be drawn towards each other, as previously described herein.

It will be understood that if the operator wishes to later remove the strap 22 from about the load 20, tension has to be reduced in the strap 22. This may be accomplished by the operator engaging the hand-drill 70 with one or the other of the high range first driveshaft 58 or low range second driveshaft 62 as previously described herein. Then, instead of causing clockwise rotation "A" or "A1" in the first driveshaft 58 or 62, respectively, the drill 70 will be set to cause counter-clockwise rotation of the engaged first driveshaft 58 or 62 about the respective axis "X1" or "X3", i.e., in the opposite direction to "A" or "A1". The rotational motion of all other components described herein with respect to increasing tension in strap 22 will be reversed. The end result will be that the eyes 64*b* of the first and second end linkages 30, 32 will move further apart from each other, i.e., the distance between the two eyes 64*b* along the lateral axis "Z" will be increased. The first and second end linkages 30, 32 can then be disengaged from the securement point 14*a* and first end of strap 22. The strap 22 is then able to be removed from around the load 20.

In summary, a method of adjusting tension in a tie-down member 22 used to secure a load 20 to a vehicle 10 or a support surface 14 comprises providing a load binder 24 having a connector mechanism 28, 30, 32 operatively engaged with a gear mechanism provided in a housing 34 of the load binder 24; wherein the connector mechanism 28, 30, 32 extends outwardly from the housing 34 and includes a first end linkage 30 and a second end linkage 32 and is actuated via the gear mechanism; providing a first driveshaft 58 on the load binder 24 configured to actuate the connector mechanism at a first speed; providing a second driveshaft 62 on the load binder 24 configured to actuate the connector mechanism at a second speed that is different from the first speed; engaging the first end linkage with a first region of the tie-down member 22; engaging the second end linkage with another region of the tie-down member or with a securement region on the vehicle, the support surface, or the load. As shown in FIG. 1, the second end linkage 32 is engaged with a link at one end 22*a* of the strap 22 and the first end linkage 30 is engaged with a securement point 14*a* on the vehicle 10 but it will be understood that any other arrangement could be used instead. The operator will then select one of the first driveshaft 58 and the second driveshaft 62 for actuating the connector mechanism and will engage the drill 70 therewith. Typically, the operator will select the higher speed driveshaft, i.e., first driveshaft 58 to initially rapidly change the distance between the first end linkage 30 and the second end linkage 32. Drill 70 is engaged with first driveshaft 58 via the nut 58*d* (FIG. 7). Since first driveshaft 58 is operatively engaged with a the larger diameter first spur gear 52 and is furthermore directly connected to the worm gear 50, the first driveshaft is capable of operating at a higher speed than the second driveshaft 62 which is operatively engaged with the smaller diameter second spur gear 56. Effecting movement of the connector mechanism with this higher speed driveshaft 58 is particularly useful when the strap or chain 22 is to be placed under increased tension, i.e., tightened around the load 20. The operator will use the drill 70 to rotate first driveshaft 58 to move the first and second end linkages 30, 32 quickly towards each other until drill 70 starts to have a little difficulty in rotating the first driveshaft 58. The operator will then disengage the drill 70 from the first driveshaft 58 and will then engage the drill 70 with the second driveshaft 62 (via nut 62*d*— FIG. 8) to rotate the same. Since second driveshaft 62 operates at a lower speed and is engaged with the smaller diameter second spur gear 56, the second driveshaft 62 is able to be used to provide the necessary torque to complete tightening the strap or chain 22 to a sufficient degree to adequately secure the load 20 to the trailer 14 (or other support surface).

The step of actuating the drill 70 includes rotating the selected first driveshaft 58 or second driveshaft 62 in a clockwise direction ("A" or "A1" shown in FIGS. 7 and 8); decreasing the distance between the first end linkage 30 and the second end linkage 32; and increasing the tension in the tie-down member 22. The method may also include actuating the drill 70 by rotating the selected first driveshaft 58 or second driveshaft 62 in a counter-clockwise direction; increasing the distance between the first end linkage 30 and the second end linkage 32; and decreasing the tension in the tie-down member 22.

It will be understood that each of the driven first driveshaft 58 and second driveshaft 62 is selectively individually rotated by the drill 70 in a clockwise direction to effect a first direction of rotational motion in the worm gear 50 and is selectively individually rotated in a counter-clockwise direction to effect a second direction of rotational motion in the worm gear 50 in order to adjust the overall distance between the first end linkage 30 and second end linkage 32, and thereby to change the tension in strap 20.

It will be understood that in certain instances, when load binder 24 is used to secure load 20 to a trailer 14, for example, the bottom end 36*b* of handle 36 may be placed in direct contact with the trailer bed. Then, when load binder 24 is actuated to increase the tension in the chain or strap 22, the handle 36 will be forced into contact with the trailer bed. Handle 36 thereby acts as a reaction force lever that helps to ensure that the chain 22 will not tend to work its way loose as the vehicle 10 travels from one location to another, particularly on bumpy roads.

Referring now to FIGS. 10-13, load binder 24 may be used for purposes other than tightening a strap 22 about a load. One other alternative use of load binder is that shown in FIGS. 10-13 which is operation of landing gear 74 (also known as a "trailer jack"). The landing gear 74 illustrated in FIG. 10 may be similar in operation to the landing gear 18 shown in FIG. 1. Load binder 24 may be used to operate either landing gear 74 or 18. Landing gear 74 is illustrated as being provided on a tow hitch assembly 76 of a caravan or camper trailer 78. In particular, the caravan or camper trailer 78 is illustrated as being towable by a truck 80. If the trailer hitch assembly 76 is to be disengaged from truck 80, the landing gear 74 needs to be actuated so that it can support the portion of the trailer hitch assembly 76 that remains engaged with the camper trailer 78. In particular, a foot 74*a* of the landing gear 74 needs to be lowered to the point it contacts the ground "G". A method of using a torque load binder to raise or lower a landing gear or trailer jack is disclosed in a related application to the same inventor and Assignee is disclosed in U.S. patent application Ser. No. 16/272,446 (Helline), filed Feb. 11, 2019. The entire disclosure of U.S. patent application Ser. No. 16/272,446 is incorporated herein by reference.

Figure 11:
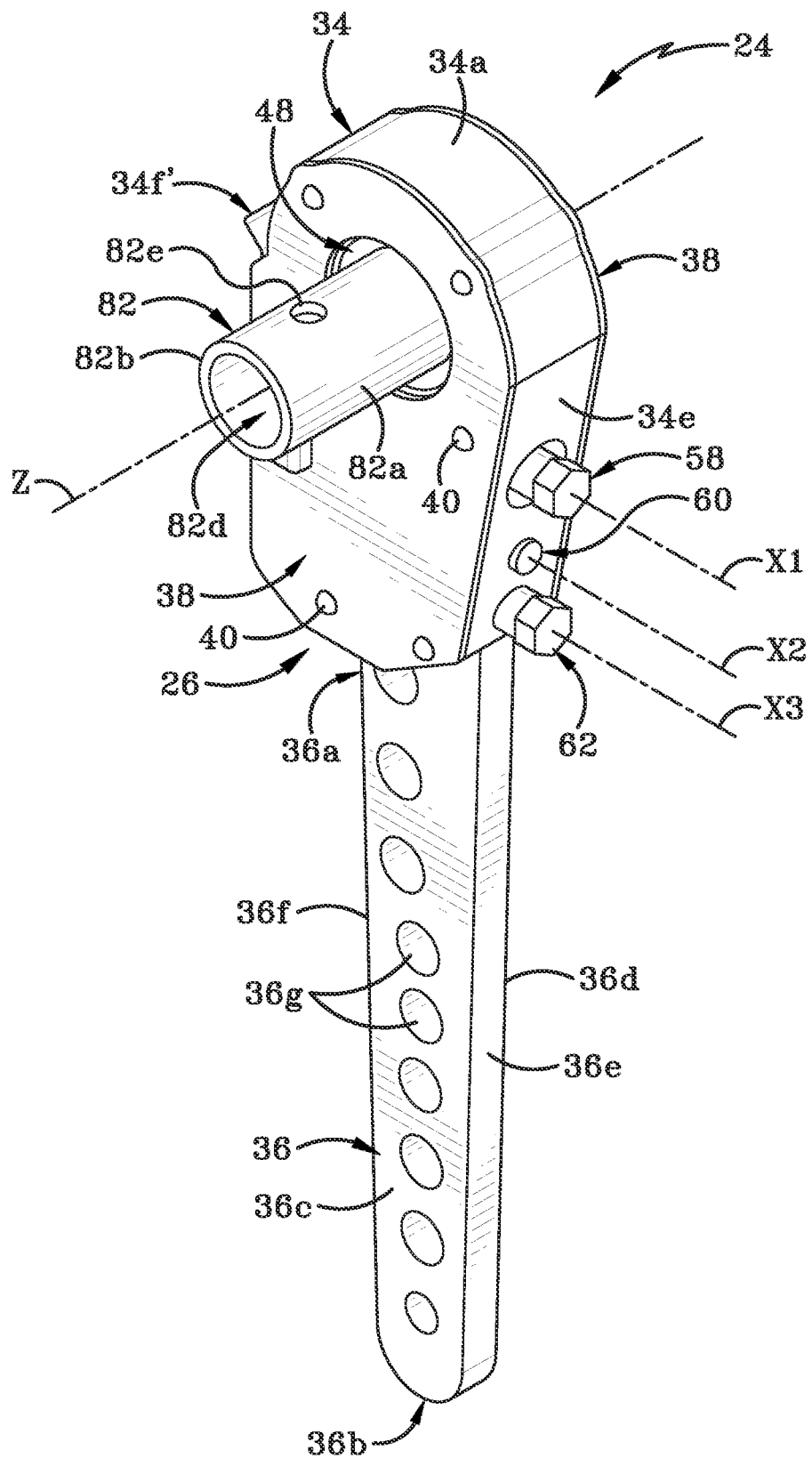
FIG. 11 is a top, front, left side isometric perspective view of the dual drive torque load binder adapted for actuating the landing gear as illustrated in FIG. 10.
Figure 12:
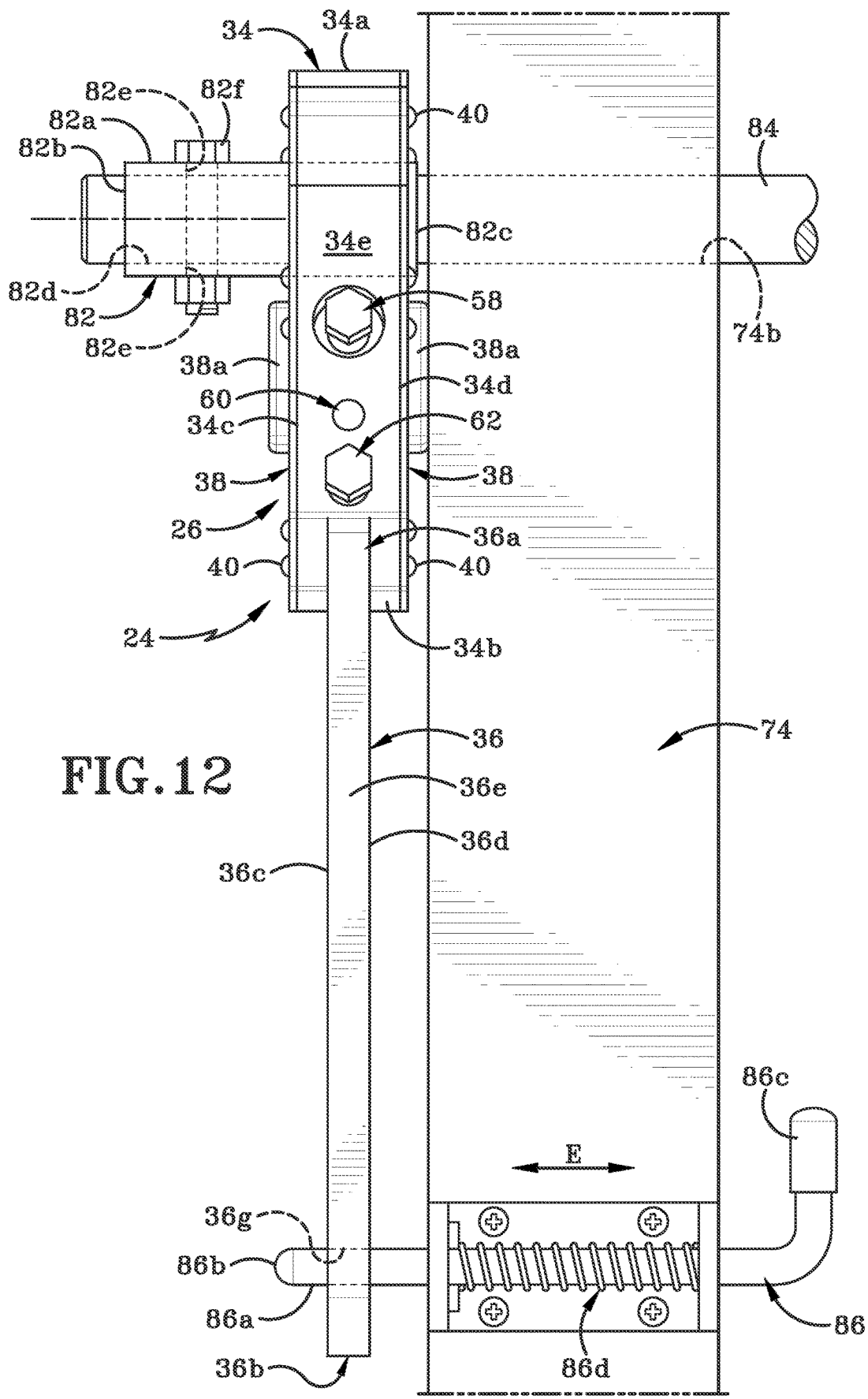
FIG. 12 is a front elevation view of the adapted dual drive torque load binder engaged with the landing gear shown in FIG. 10.

In order to effect the motion of the foot 74*a* of landing gear 74 with the load binder 24 in accordance with the present disclosure, the operator "P" will remove the barrel 28 from load binder 24 and will replace it with a connector 82 (FIG. 11). The connector 82 is a generally cylindrical sleeve 82a with a first end 82b and a second end 82c. The sleeve 82a defines a bore 82d therein that extends from first end 82b to second end 82c. A pair of aligned through-holes 82e are defined in sleeve a short distance from first end 82b. The holes 82e are oriented at right angles to a longitudinal axis of the sleeve 82a (where that longitudinal axis extends between first end 82b and second end 82c. Holes 82e are in communication with bore 82d. Sleeve 82a is of an external diameter substantially identical to barrel 28 but the length of sleeve 82a is shorter than the barrel 28 and no end linkages 30, 32 are provided. Sleeve 82a is inserted into the central hole 48a of ring gear 48 in place of barrel 28. Sleeve 82a of connector 82 may simply extend to a point where second end 82c thereof is substantially flush with the cover 38 that is on the opposed face of housing 34 from the direction that the sleeve 82a is inserted into the central hole 48a of ring gear 48.

Prior to use of the presently disclosed load binder 24, when landing gear 74 was previously typically to be raised or lowered, the operator "P" would insert a crank handle into a passage 74b (FIG. 12) that is defined in an upper end of landing gear 74. The operator would then rotate the crank handle until the foot 74a was lowered into contact with the ground "G".

Instead, load binder 24 may be used in place of the crank handle. In order to do this, a rod 84 is engaged with the connector 82 and the end of the rod 84 is then inserted into the passageway 74b defined in the loading gear in place of the crank handle. To secure the rod 84 to the connector 82, the rod 84 is inserted through the bore 82d of connector 82 and aligned openings defined in the circumference of rod 84 are aligned with the holes 82e defined in connector 82. A fastener 82f is then inserted through the aligned holes in the connector 82 and rod 84 to secure the two components together.

At this point, an operator "P" could engage the drill 70 with either of the driveshafts 58 or 62 and actuate the drill 70 to ultimately rotate the connector 82 (in a similar manner to barrel 28 as described previously herein). However, because there are no end linkages 30, 32 provided on load binder 24, there is a risk that the load binder 24 will rotate in response to the actuation of the drill 70 instead of driving rotation of the connector 82. The operator "P" could simply hold the handle 36 against the landing gear 74 but if he or she forgets to do so, the handle 36 may rotate upwardly and injure the operator "P". In order to eliminate this possibility, the operator "P" may, instead, manipulate the handle 36 of the load binder 24 to bring one of the through-holes 36g in the handle into alignment with a locking mechanism 86 that is already provided as part of the landing gear 74. Locking mechanism 86 includes an L-shaped engageable arm 86a with a first end 86b and a second end 86c. Locking mechanism 86 further includes a spring mechanism 86d that is disposed in the interior of the landing gear 74 and is able to move the arm 86a in the manner indicated by arrow "E" in FIG. 12. The operator "P" will retract the arm 86a in such a way that the first end 82b thereof does not extend much outwardly beyond an exterior wall of the landing gear 74 and will therefore not interfere with handle 36 of load binder 24. The handle 36 will be pivoted about the "Z" axis extending along the rod 84 until one of the through-holes 36g defined in the handle 36 aligns with the first end 86b of the arm 86a. The arm 86a will be released and the spring mechanism 86d will return the arm 86a to its original position, moving the first end 86b through the aligned through-hole 36g.

The above-described arrangement ensures that when drill 70 is used to actuate the selected first driveshaft 58 or 62, the handle 36 will remain in a generally fixed position relative to the landing gear 74. When handle 36 is secured in place, the operator "P" will engage drill 70 with the selected first driveshaft 58 or 62 and will actuate the drill 70 to rotate the selected driveshaft in a clockwise direction. Ultimately, as previously described herein with respect to the tightening of strap 22, rotational motion imparted to the driveshaft by drill 70 will cause the connector 82 to rotate about the lateral axis "Z". Rotation of the connector 82 will cause rotation of the rod 84 and thereby lower the foot 74a of the landing gear 74 to the ground "G" utilizing the raising/lowering mechanism (not shown) provided as part of the landing gear.

Once the foot 74a of the landing gear 74 is on the ground "G", the arm 86a of locking mechanism 86 can be retracted once again so that the handle 36 of the load binder 24 is free to move. The fastener 82f may then be disengaged to detach the connector 82 from the rod 84 and the load binder 24 may be removed from the landing gear 74.

When it is later desired to tow the camper trailer 78 again, load binder 24 may be reengaged with the landing gear 74 in the same manner as described above. The drill 70 may be engaged with the load binder 24 to raise the landing gear's foot 74a from contact with the ground "G". The only difference in the above-described methodology that changes when raising the foot 74a is that the drill 70 will be set to rotate the selected first driveshaft 58 or 62 counter-clockwise instead of clockwise. All other steps are as discussed above.

As shown in FIG. 13, Possible directions of rotation that may be imparted by drill 70 to the selected driveshaft are indicated by the arrow "F". Rotation of the connector 82 as imparted by the drill 70 may cause a slight rotational movement in the upper end of the load binder 24. This imparted slight motion is indicated by the arrow "H". Possible lowering or raising motions of the landing gear foot 74a are indicated by the arrow "J".

As indicated earlier in the description of load binder 24, a variety of differently shaped, sized, and placed through-holes 36g are provided on handle 36 of load binder 24. The variety of through-holes 36g on handle 36 enables the operator "P" to select the most suitable through hole 36g for engagement with differently configured landing gear assemblies. Additionally, if, for some reason, the drill 70 cannot be used to actuate the load binder 24 (when tightening or loosening chains 22 or raising or lowering landing gear 74, or performing other tasks), a crank handle can be secured to handle 36 by passing a fastener through any selected through-hole in handle 36 and then manually rotating the handle 36 in a similar fashion to operating a ratchet load binder.

In summary, a method of raising or lowering a landing gear 74 includes providing a load binder 24 having a connector mechanism 82 (FIG. 11) operatively engaged with a gear mechanism provided in a housing 34 of the load binder 24; engaging the connector mechanism 82 to a rod 84 extending outwardly from the landing gear 74, wherein the rod is part of an assembly (not shown but disclosed in U.S. patent application Ser. No. 16/272,446, incorporated by reference herein) in the landing gear 74 that is adapted to move a landing gear foot 74a towards or away from a ground surface "G". The method further includes providing a first driveshaft 58 on the load binder 24 configured to actuate the connector mechanism 82 at a first speed; providing a second driveshaft 62 on the load binder configured to actuate the connector mechanism 82 at a second speed that is different from the first speed; selecting one of the first driveshaft 58 and the second driveshaft 62 for actuating the connector mechanism; engaging a powered hand-held drill 70 with the selected one of the first driveshaft 58 and the second driveshaft 62; actuating the drill 70; actuating the connector mechanism 82; rotating the rod 84 with the connector mechanism 82; actuating the assembly in the landing gear 74; and moving the landing gear foot 74a one of towards the ground surface "G" and away from the ground surface "G" with the assembly.

The actuating of the drill further comprises rotating the selected first driveshaft 58 or the second driveshaft 62 in a clockwise direction and lowering the landing gear foot 74a towards the ground surface "G"; or rotating the selected first driveshaft 58 or the second driveshaft 62 in a counter-clockwise direction and raising the landing gear foot 74a away from the ground surface "G".

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A method of raising or lowering a landing gear, said method comprising:
providing a gear mechanism within a housing;
operatively engaging the gear mechanism with an assembly provided in the landing gear, wherein the assembly is operable to move a landing gear foot in one of a first direction and a second direction;
coupling a first driveshaft and a second driveshaft with the gear mechanism;
selecting one of the first driveshaft and the second driveshaft to actuate the gear mechanism;
engaging a powered hand-held drill with the selected one of the first driveshaft and the second driveshaft;
actuating the powered hand-held drill;
rotating the selected one of the first driveshaft and the second driveshaft with the powered hand-held drill;
actuating the assembly provided in the landing gear in response to the rotation of the selected one of the first driveshaft and the second driveshaft; and
moving the landing gear foot of the landing gear in the one of the first direction and the second direction;
providing a handle on the housing, wherein the handle is elongate;
engaging a locking mechanism;
securing the handle to the landing gear with the locking mechanism; and
preventing rotation of the handle relative to the landing gear upon actuation of the powered hand-held drill.

2. The method according to claim 1, wherein rotating the selected one of the first driveshaft and the second driveshaft includes rotating the selected one of the first driveshaft and the second driveshaft with the powered hand-held drill in a clockwise direction; and lowering the landing gear foot towards the ground surface.

3. The method according to claim 1, wherein rotating the selected one of the first driveshaft and the second driveshaft includes rotating the selected one of the first driveshaft and the second driveshaft with the powered hand-held drill in a counter-clockwise direction; and raising the landing gear foot away from the ground surface.

4. The method according to claim 1, wherein coupling the first driveshaft and the second driveshaft to the gear mechanism comprises coupling the first drive shaft and the second driveshaft to a spur gear mechanism.

5. The method according to claim 4, further comprising coupling the first driveshaft to a first spur gear of the spur gear mechanism.

6. The method according to claim 5, further comprising coupling the second driveshaft to a second spur gear of the spur gear mechanism, wherein the first spur gear is of a greater diameter than the second spur gear.

7. The method according to claim 6, further comprising interposing at least a third spur gear between the first spur gear and the second spur gear.

8. The method according to claim 6, further comprising:
operatively engaging the assembly of the landing gear with a worm gear mechanism of the gear mechanism.

9. The method according to claim 8, further comprising:
driving the worm gear mechanism with the spur gear mechanism.

10. The method according to claim 8, further comprising coupling a worm gear of the worm gear mechanism to the first driveshaft of the spur gear mechanism.

11. The method according to claim 10, further comprising rotating the worm gear and first driveshaft in unison.

12. The method according to claim 10, further comprising:
coupling a ring gear of the worm gear mechanism with the worm gear; and
coupling the ring gear to the assembly of the landing gear.

13. The method according to claim 10, further comprising rotating the selected one of the first driveshaft and the second driveshaft with the powered hand-held drill in a clockwise direction to effect a first rotational motion in the worm gear.

14. The method according to claim 13, further comprising rotating the selected one of the first driveshaft and the second driveshaft with the powered hand-held drill in a counter-clockwise direction to effect a second rotational motion in the worm gear, wherein the second rotational motion is opposite the first rotational motion.

15. The method according to claim 1, further comprising:
providing a grease port defined in an exterior surface of the housing;
selectively placing the grease port in fluid communication with an interior of the housing; and
introducing grease into the interior of the housing through the grease port.

16. The method according to claim 1, further comprising:
engaging an end of the selected one of the first drive shaft and the second driveshaft with a socket provided on a chuck of the powered hand-held drill;
rotating the selected one of the first driveshaft and the second driveshaft with the powered hand-held drill in a first direction to lower the landing gear foot relative to a ground surface; and
rotating the selected one of the first driveshaft and the second driveshaft with the powered hand-held drill in a second direction to raise the landing gear foot relative to the ground surface.

17. The method according to claim 1, wherein providing the gear mechanism includes:
providing a first spur gear and a worm on the first driveshaft;
providing a second spur gear on the second driveshaft, wherein the second spur gear is of a smaller diameter than the first spur gear;
coupling the second spur gear and the first spur gear to one another via a third spur gear;
coupling a ring gear with the worm; and
coupling the ring gear with the assembly of the landing gear.

18. The method according to claim 1, wherein the selecting of one of the first driveshaft and the second driveshaft includes selecting one of a first speed and a second speed at which to move the landing gear foot, wherein the second speed is different from the first speed.

* * * * *